US008955041B2

(12) United States Patent
Esaki et al.

(10) Patent No.: US 8,955,041 B2
(45) Date of Patent: Feb. 10, 2015

(54) AUTHENTICATION COLLABORATION SYSTEM, ID PROVIDER DEVICE, AND PROGRAM

(71) Applicants: Kabushiki Kaisha Toshiba, Minato-ku (JP); Toshiba Solutions Corporation, Minato-ku (JP)

(72) Inventors: Yuuichirou Esaki, Tokyo (JP); Seiichiro Tanaka, Saitama-ken (JP); Minoru Nishizawa, Tokyo (JP); Masataka Yamada, Tokyo (JP); Tatsuro Ikeda, Tokyo (JP)

(73) Assignees: Kabushiki Kaisha Toshiba, Minato-ku (JP); Toshiba Solutions Corporation, Minato-ku (JP)

( * ) Notice: Subject to any disclaimer, the term of this patent is extended or adjusted under 35 U.S.C. 154(b) by 16 days.

(21) Appl. No.: 13/785,849

(22) Filed: Mar. 5, 2013

(65) Prior Publication Data
US 2013/0219461 A1 Aug. 22, 2013

Related U.S. Application Data

(63) Continuation of application No. PCT/JP2012/005934, filed on Sep. 18, 2012.

(30) Foreign Application Priority Data

Feb. 17, 2012 (JP) ................................. 2012-033391

(51) Int. Cl.
*H04L 29/06* (2006.01)
(52) U.S. Cl.
CPC ...................................... *H04L 63/08* (2013.01)
USPC .............................................................. 726/1

(58) Field of Classification Search
None
See application file for complete search history.

(56) References Cited

U.S. PATENT DOCUMENTS

| 7,617,523 B2* | 11/2009 | Das et al. ........................... 726/5 |
| 2005/0204041 A1* | 9/2005 | Blinn et al. ................... 709/225 |
| 2012/0254935 A1* | 10/2012 | Yato et al. .......................... 726/1 |

FOREIGN PATENT DOCUMENTS

| JP | 2002-123491 A | 4/2002 |
| JP | 2007-323340 A | 12/2007 |

(Continued)

OTHER PUBLICATIONS

International Search Report issued Dec. 4, 2012 in PCT/JP2012/005934.
Yoshisato Takeda, et al., "One-step authentication technology for web-based distributed systems", Mitsubishi, vol. 81, No. 7, Jul. 25, 2007, pp. 59-62.

*Primary Examiner* — Brandon Hoffman
*Assistant Examiner* — Wasika Nipa
(74) *Attorney, Agent, or Firm* — Oblon, Spivak, McClelland, Maier & Neustadt, L.L.P.

(57) ABSTRACT

A policy storage unit of an ID provider device according to an embodiment stores, for each service provider ID, policy information representing a user to which transmission of service data is permitted and policy information representing a user of a target in which transmission permission of service data is deleted. When a predetermined cycle comes or when a use status of the service provider device changes, the ID provider device acquires use status information of the service provider device transmitted from the service provider device, and updates a service use status storage unit based on the acquired use status information. When the service use status storage unit is updated, the ID provider device decides a deletion target account of each service provider ID.

6 Claims, 23 Drawing Sheets

(56) References Cited

FOREIGN PATENT DOCUMENTS

| JP | 2008-538247 A | 10/2008 |
| JP | 2010-282362 A | 12/2010 |
| JP | 2011-59943 A | 3/2011 |
| JP | 2011-253450 A | 12/2011 |
| JP | 4892093 B1 | 3/2012 |
| JP | 2012-103846 A | 5/2012 |

* cited by examiner

| Item name | Item value | | | |
|---|---|---|---|---|
| | | | | 201a |
| User ID | USER_A | USER_B | ... | USER_N |
| Password | PASS_A | PASS_B | | PASS_N |
| Name | xxxxxx | yyyyyy | | YYYYXXX |
| Employee no. | 20100030 | 20100031 | | 20100032 |
| Department | X Department | X Department | | XX Department |
| Division | Y division | Y division | | Y division |
| Appointment | Z appointment | Z appointment | | Z appointment |
| ... | ... | ... | | ... |
| Address information | USER_A@OOO.co.jp | USER_B@OOO.co.jp | | USER_N@OOO.co.jp |
| Authentication collaboration ID | | NOPQRSTUVWXYZ | | ABCDEFG |
| Working state | Working | Temporary retirement | | Temporary retirement |

IDP user repository

FIG.2

AUTHENTICATION COLLABORATION SYSTEM, ID PROVIDER DEVICE, AND PROGRAM

CROSS-REFERENCE TO RELATED APPLICATIONS

This application is a Continuation of PCT International Application No. PCT/JP2012/005934, filed Sep. 18, 2012 and which claims the benefit of priority from Japanese Patent Application No. 2012-033391, filed Feb. 17, 2012, the entire contents of both which are incorporated herein by reference.

FIELD

Embodiments of the present invention relate to an authentication collaboration system, an ID provider device, and a program.

BACKGROUND

As the dependence of society, economy, and living on an on-line service increases, the importance of identity management of managing information related to an individual or an organization is recently increasing. The identity management refers to a technique of increasing security and convenience of information related to an individual or an organization in various services or systems and managing an overall life cycle of an identity from registration to change and deletion.

Here, the identity is the totality of information specifying an individual, a group, an organization, or a company in a certain situation, and includes an identifier, a credential, and an attribute. The identifier is information identifying an identity, and corresponds to an account (a user ID), an employee number, or the like. The credential is information representing validity of certain information content, and includes a password or the like. The attribute is information characterizing an identity, and represents a name, an address, a date of birth, and the like.

As a representative example of a technique using an identity management technique, there is a single sign-on (hereinafter, referred to as an "SSO"). The SSO is a technique by which a plurality of applications or services can be used by a single authentication procedure.

There is a single sign-on as a technique of performing authentication collaboration capable of using a plurality of applications or services by a single authentication procedure. In the SSO, there are many cases in which authentications included in a plurality of applications are integrated in a single domain such as the Intranet of one company.

In addition, in recent years, the SSO is required between different domains (hereinafter, referred to as "cross domain"). The reasons may include an increase in corporate marriage or merge, overseas development, and the like, and an outsourcing by software as a service (SaaS) of raised cloud computing or the like.

However, in implementing the cross domain SSO, there is a problem in that a great deal of time and effort are required to share an authentication result. The main problems are the following two points.

A first problem lies in that since a use of an HTTP cookie is limited to a single domain, it is difficult to share an authentication result between domains using an HTTP cookie. A second problem lies in that since an SSO scheme of an access management product employed by each domain differs according to a vender, it is difficult to simply introduce, and it is necessary to prepare a separate measure.

In order to solve the above problems, there is a demand for standardization of an SSO among venders. As one of representative standard techniques to comply with a request, there is a security assertion markup language (SAML) made by an organization for the advancement of structured information standards (OASIS) which is a non-profitable organization.

The SAML is a specification that defines an expression form of information related to an authentication, an authorization, and an attribute and transmission and reception procedures, and is systematically specified so that an implementation can be made in various forms according to the purpose. Main entities include three of an identity provider (hereinafter, referred to as an "IDP" or "ID provider"), a service provider (hereinafter, referred to as an "SP" or "service provider"), and a user, and the SSO is implemented such that the service provider trusts in an authentication result issued by the ID provider.

When the SSO starts based on the SAML, it is generally necessary to prepare the following two points in advance. Firstly, a relation of trust needs to be constructed through information exchange or an agreement in a business or a technology between the service provider and the ID provider. Secondly, each user has an individual account for each service provider, and thus the individual SP account needs to collaborate with an account of the ID provider in advance (hereinafter, referred to as "account collaboration"). After advance preparation such as construction of the relation of trust and prior account collaboration is finished, the SSO can be performed.

After the advance preparation, the SSO is implemented by the following procedures (1) to (6). Here, an SSO procedure of a service provider-originated model using a user terminal will be described. In this procedure, basically, the process is performed in the ascending order unless otherwise set forth in.

(1) The user requests the service provider to provide a service.

(2) The service provider transmits an authentication request to the ID provider through a user side terminal since the user is not authenticated yet.

(3) The ID provider performs authentication on the user by a certain procedure, and generates an authentication assertion. The SAML does not specify an authentication means, and specifies only a system in which the authentication assertion is transmitted to the service provider. The authentication assertion includes information representing a way of generating the type of authentication means or a credential since the service provider determines whether or not the service provider can trust in an authentication result.

(4) The ID provider transmits the authentication result including the generated authentication assertion to the service provider through the user terminal.

(5) The service provider decides whether or not a service is to be provided based on the authentication result of the ID provider.

(6) The user is provided with a service from the service provider.

As described above, in the SSO based on the SAML, as the ID provider performs a single authentication procedure, the user can use a plurality of services without an additional authentication procedure. Currently, many venders are providing an access management product having IDP and SP functions of the SAML or a SaaS service having an SP function of the SAML.

However, the SSO based on the SAML is mere a part such as "use" of identity in an overall life cycle of an identity. As described above, when the SSO starts, it is necessary to perform account collaboration, and in order to perform account collaboration, a technique of comprehensively collaborating management such as registration, change, deletion, reissue, and temporary suspension of an identity between the service provider and the ID provider is required.

As a technique for automating registration, change, deletion, reissue, and temporary suspension of an identity, there is account provisioning, and as a standard technique thereof, there is a service provisioning markup language (SPML).

Meanwhile, there has been known a data processing system that actively executes account collaboration as a part of the SSO in a state in which the advance preparation of the account collaboration is not finished. Typically, when the SSO starts in a state in which the user's account is not registered to the service provider side, that is, in a state in which account collaboration is not performed, an error occurs.

However, according to this data processing system, the account collaboration can be actively executed as a part of the SSO even in the above-described state. Specifically, after the service provider receives a service request from the user, the service provider checks that information sufficient to register the user's account is not held. After checking, the service provider requests the ID provider to provide a user attribute, and the ID provider provides the service provider with a desired user attribute. As a result, the data processing system executes account registration and collaboration in the process of the SSO.

The above-described data processing system can request and provide the user attribute necessary for the individual user's account registration through a lightweight process, and has no problem in that a large quantity of preliminary process on many users is unnecessary.

However, according to the study of the present inventor(s), the following can be further improved.

Typically, when a company uses a service provided by the service provider, an information system (IS) section that controls an information system of a company in general performs account registration and collaboration on the service provider.

The IS section collectively performs account registration and collaboration on the user after a large quantity of preliminary process according to many users belonging to a company or after a procedure based on a series of authorization flow is performed at an arbitrary timing by the user.

Here, when the preliminary process of the former is performed, since account registration and collaboration need not to be executed in the process of the SSO, it is not related to the above-described data processing system.

Meanwhile, when the authorization flow of the latter is performed, a great deal of time and effort are required since a lot of manpower is necessary such as seniors, a procurement section, and an IS section of an organizational hierarchy to which the user belongs as well as the user. In addition, since the IS section does not collectively perform the preliminary process, a manual work is necessary, and a burden is great, and thus efficiency or convenience is bad. For example, it is difficult to have an advantage that it can be quickly used in the SaaS or the like.

Thus, in a system in which account registration and collaboration are executed in the process of the SSO, it is desirable to include a seamless system capable of deciding whether or not a service can be used without involving a manual operation.

In light of the foregoing, the present invention is directed to providing an authentication collaboration system, an ID provider device, and a program, which are low in the user's burden and capable of deciding whether or not a service can be used without involving a manual operation when account registration and collaboration are executed in the process of the SSO.

BRIEF DESCRIPTION OF THE DRAWINGS

FIG. 2 is a schematic diagram for describing an IDP user repository according to an embodiment.

DETAILED DESCRIPTION

A policy storage unit of an ID provider device according to an embodiment stores policy information representing a user to which transmission of service data is permitted and policy information representing a user of a target in which transmission permission of service data is deleted. When a predetermined cycle comes or when a use status of the service provider device changes, the ID provider device acquires use status of the service provider device transmitted from the service provider device, and updates a service use status storage unit based on the acquired use status. When the service use status storage unit is updated, the ID provider device decides a deletion target account of each service provider ID.

(First Embodiment)

Hereinafter, an authentication collaboration system according to the present embodiment will be described with reference to FIGS. 1 to 23.

Figure 1:
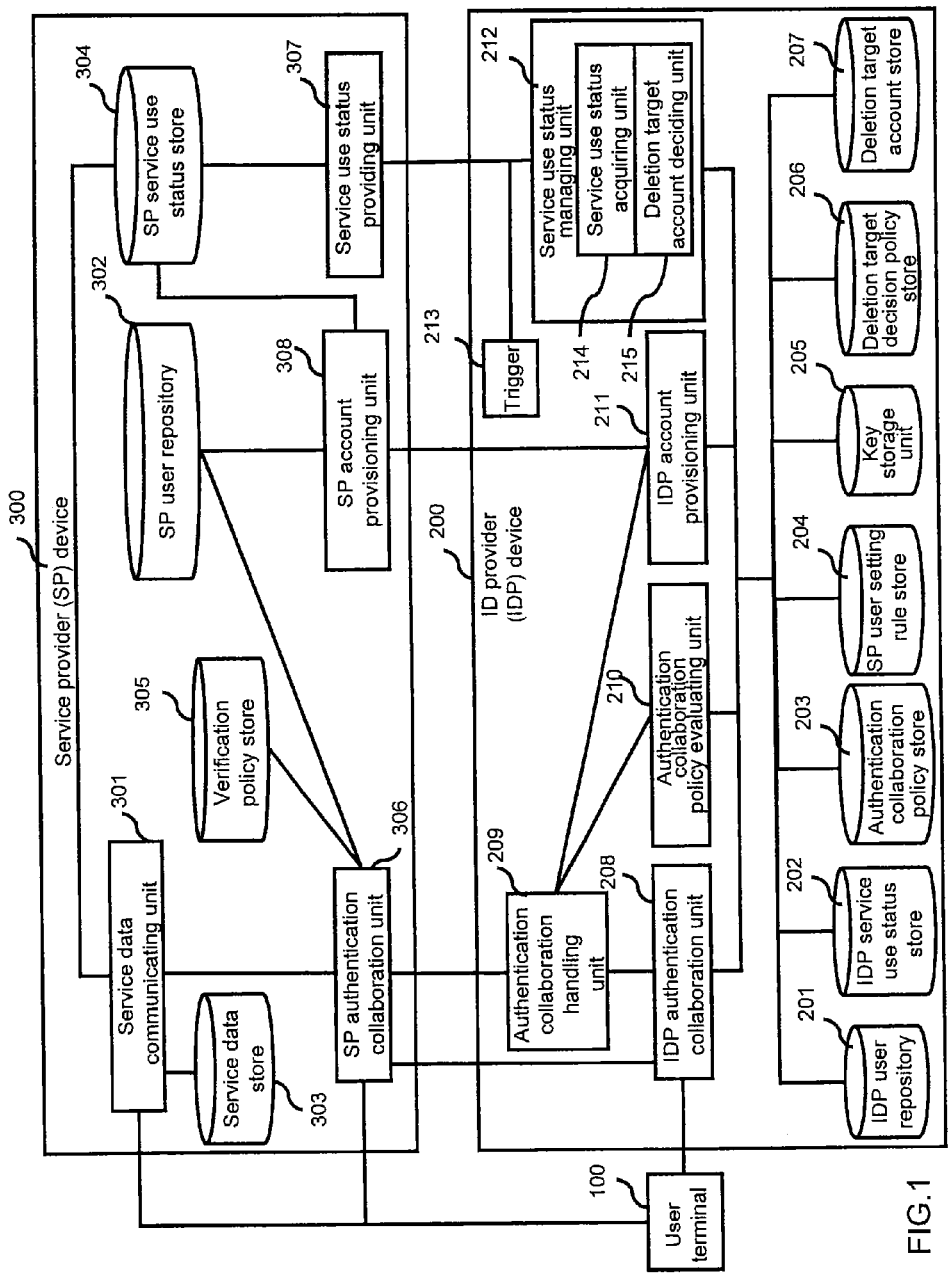
FIG. 1 is a block diagram illustrating an example of a hardware configuration of an authentication collaboration system according to an embodiment.

FIG. 1 is a block diagram illustrating a basic configuration of an authentication collaboration system according to the present embodiment. The authentication collaboration system includes an ID provider device 200 capable of executing a log-in process on a user terminal 100 operated by the user and a service provider device 300 capable of transmitting service data to the user terminal 100 when the log-in process is successfully performed. As each of the ID provider device 200 and the service provider device 300, a plurality of devices may be provided, but only one device is here illustrated. The user terminal 100, the ID provider device 200, and the service provider device 300 may be connected to one another via a network.

The user terminal 100 is a device that has a typical computer function, and can communicate with the ID provider device 200 and the service provider device 300. The user terminal 100 includes a function of transmitting a service request for requesting a use of the service provider device 300 to the service provider device 300 in response to the user's operation, a function of executing the log-in process between the user terminal 100 and the ID provider device 200, a function of receiving service data from the service provider device 300, a function of reproducing the received service data as a central processing unit (CPU) executes a service use application program stored in a memory in advance, and a user interface function.

The ID provider device 200 functions to manage the user's identity, and includes an IDP user repository 201, an IDP service use status store 202, an authentication collaboration policy store 203, an SP user setting rule store 204, a key storage unit 205, a deletion target decision policy store 206, a deletion target account store 207, an IDP authentication collaborating unit 208, an authentication collaboration handling unit 209, an authentication collaboration policy evaluating unit 210, an IDP account provisioning unit 211, a service use status managing unit 212, and a trigger 213.

The IDP user repository 201 stores identity information (hereinafter, referred to as "user attribute information") related to the user of an organization in which the ID provider device 200 is arranged. Specifically, the IDP user repository (a user attribute information storage unit) 201 stores user attribute information 201a in which an item name of a user attribute specifying the user is associated with an item value of the user attribute as illustrated in FIG. 2, that is, stores a plurality of user attribute information 201a in which a user ID identifying the user, a password referred to when the user performs the log-in process, a user name, the user's affiliation, the user's appointment, address information of the user terminal, an authentication collaboration ID, and the like are included as item names. The authentication collaboration ID is an ID shared between the service provider device 300 and the subject device 200, and issued in an account collaboration process (which will be described later) in the present embodiment. Further, when the authentication collaboration with the service provider is not performed, the authentication collaboration ID is empty.

The user attribute information 201a is collection of information characterizing personal information. The user attribute information 201a is not limited to the above example, and for example, may further include an arbitrary item name and item value such as a phone number or a working state. For example, the password referred to when the user performs the log-in process may be biometric authentication information such as the user's fingerprint.

The IDP service use status store (a first service use status storage unit) 202 is referred to by the authentication collaboration policy evaluating unit 210, and stores service use status information 202a for each user. The service use status information 202a is a use status of a service provided by each service provider device 300 for each user ID.

Figure 3:
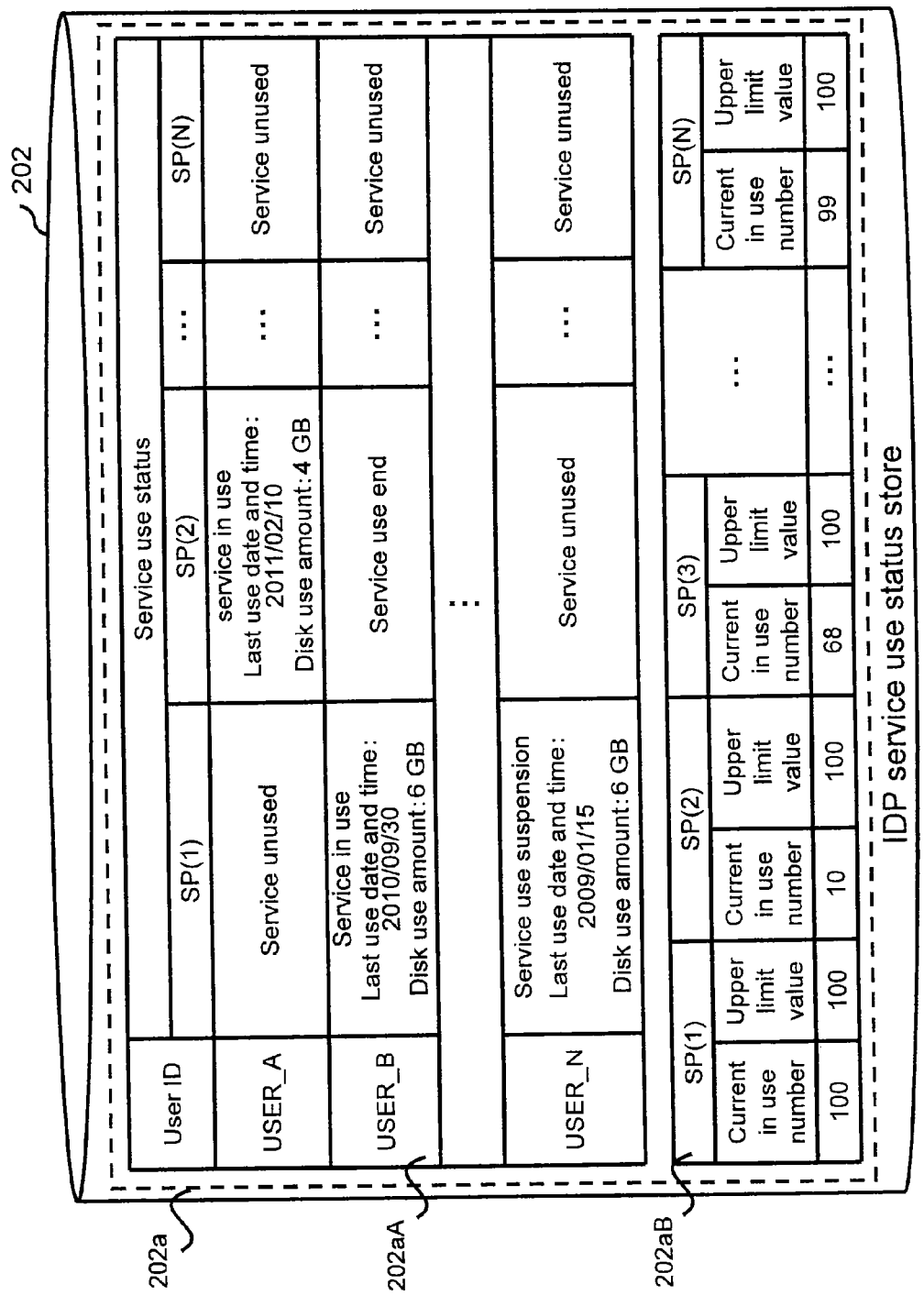
FIG. 3 is a schematic diagram for describing an IDP service use status store according to an embodiment.

In other words, the IDP service use status store 202 stores a service use status of each user at the ID provider device 200 side. As illustrated in FIG. 3, the IDP service use status store 202 stores a user use management table 202aA and an in-use number management table 202aB as the service use status information 202a. The user use management table 202aA stores a "user ID," "service provider IDs" (SP(1) to SP(N)) identifying each service provider device 300, and a "service use status" of each service provider ID in association with one another.

Examples of the service use status include "service in use" representing that transmission of service data is permitted, "service unused" representing that transmission of service data is not permitted, "service use suspension" representing temporary suspension of transmission permission of service data based on a temporary suspension request received from the user terminal 100, and "service use end" based on a use end request received from the user terminal 100. Further, when a current in-use number is larger than an upper limit value, the service use end includes a case in which the ID provider device 200 has invalidated a use of an idle user. Further, the service use status is stored in association with a last use date and time which is a last date and time (a last log-in date and time) at which the user used the service and a disk use amount.

For example, in the service use status in which the user ID of FIG. 3 is "USER_A," SP(1) is the service unused status, SP(2) is the service in use status, and SP(N) is the service unused status. Further, in SP(2), the last use date and time is 2011 Feb. 10, and the disk use amount is 4 GB.

The in-use number management table 202aB writes an in-use number representing the number of in-use services represented by the service use status in the user use management table 202aA and an upper limit value of the in-use number which is set in advance for each service provider ID in association with each other as illustrated in FIG. 3.

Figure 4:
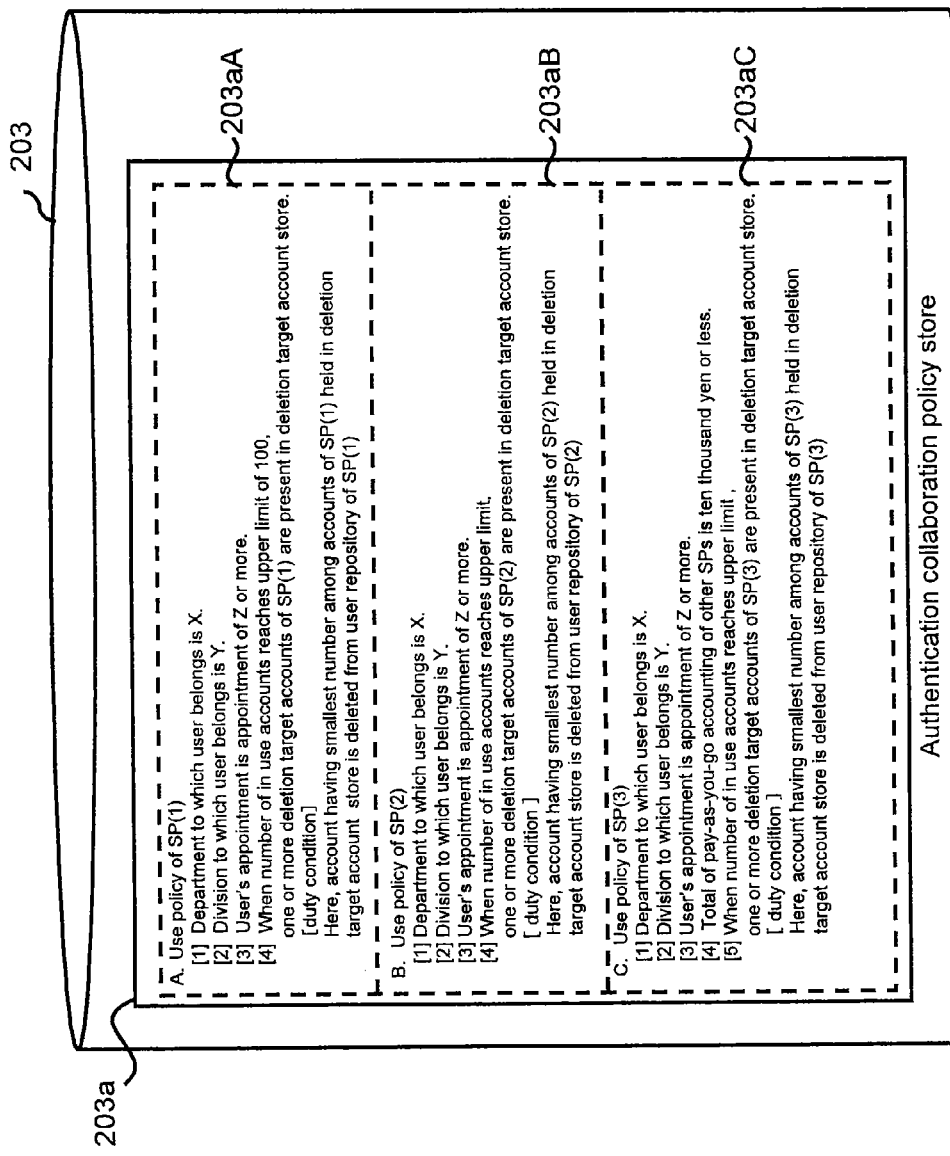
FIG. 4 is a schematic diagram for describing an authentication collaboration policy store according to an embodiment.

The authentication collaboration policy store (an authentication collaboration policy storage unit) 203 is referred to by the authentication collaboration policy evaluating unit 210, and stores an authentication collaboration policy. Specifically, the authentication collaboration policy store 203 stores a plurality of authentication collaboration policies (authentication collaboration policy information) 203a (203aA, 203aB, 203aC, and the like) representing the user's affiliation and appointment in which transmission of service data by the service provider device 300 identified by the service provider ID is permitted for each service provider ID as illustrated in FIG. 4.

The authentication collaboration policy 203a may further include an active policy (for example, [4] of C in FIG. 4) such as the number of in-use services and a total of pay-as-you-go accounting in addition to a static policy (for example, [1] to [3] of A to C in FIG. 4) such as the user's affiliation and appointment.

Here, the policy refers to collection of accessibility conditions in which whether or not (permission or rejection) who (subject) can perform which operation (action) on which system resources (resources) is generally defined. Further, as an option, it is defined even on an environmental condition or a duty condition.

For example, for each element of the above-described policy, the "subject" corresponds to a name, an appointment, an affiliation, or the like, the "resource" corresponds to the service provider ID, an URL, or the like, the "action" corresponds to a use start, a use restart, or the like, and the "environmental condition" corresponds to an IP address of the user who makes a certain request, an accessible period of time or time, or the like. Further, the "duty condition" is a work assigned when a policy (accessibility condition) evaluation result is received, and the authentication collaboration handling unit 209 executes authentication collaboration. For example, it is an instruction "a request for "registering a new user" is permitted, but "ID of idle user is deleted" has to be reliably executed" (for example, [duty condition] of [4] of A in FIG. 4).

Figure 5:
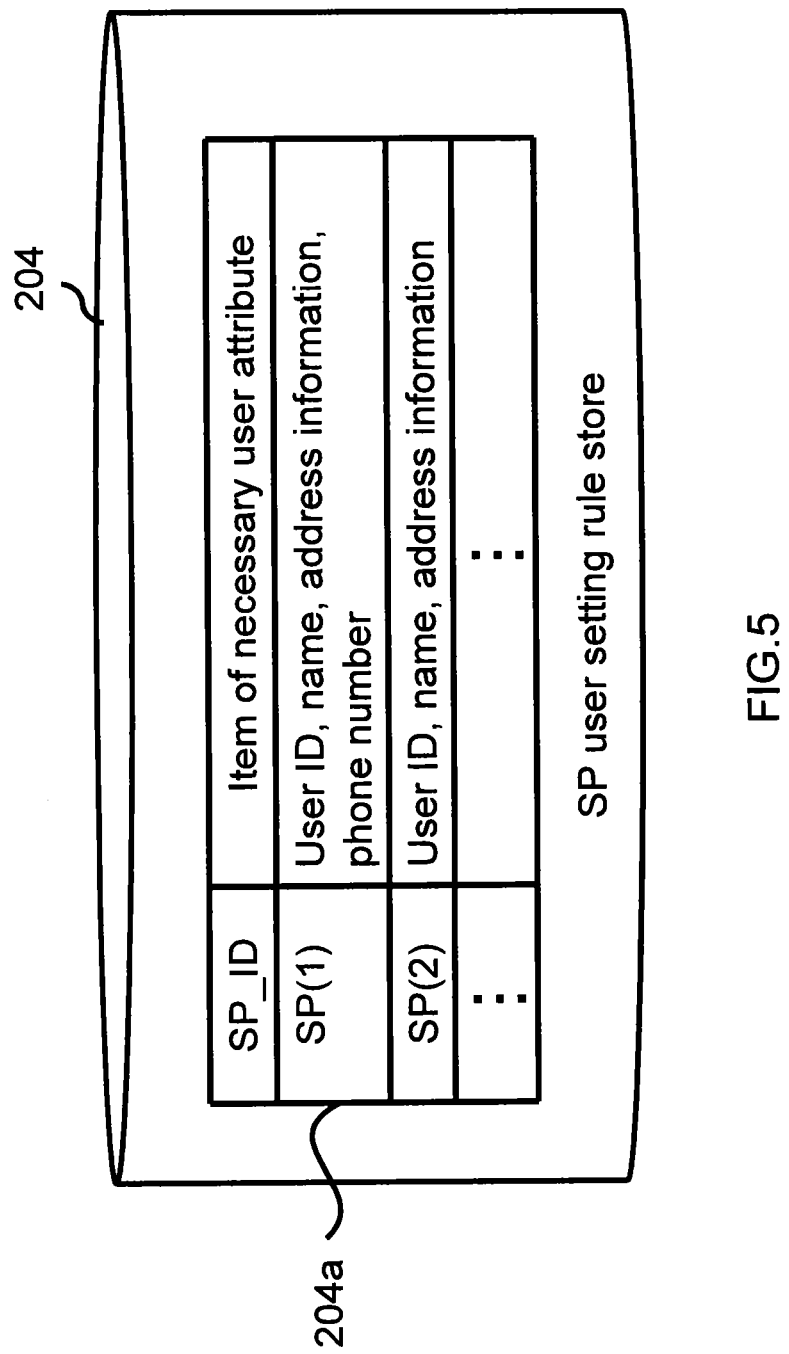
FIG. 5 is a schematic diagram for describing an SP user setting rule store according to an embodiment.

The SP user setting rule store (a partial item name storage unit) 204 stores a user setting rule 204a as illustrated in FIG. 5. The user setting rule 204a is written such that the service provider ID is associated with some item names among item names of the user attribute included in the user attribute information 201a stored in the IDP The key storage unit 205 stores a signature generation key of the subject device 200. As the signature generation key, for example, of a pair of the public key and the secret key in the public key cryptosystem, the secrete key may be used.

Figure 6:
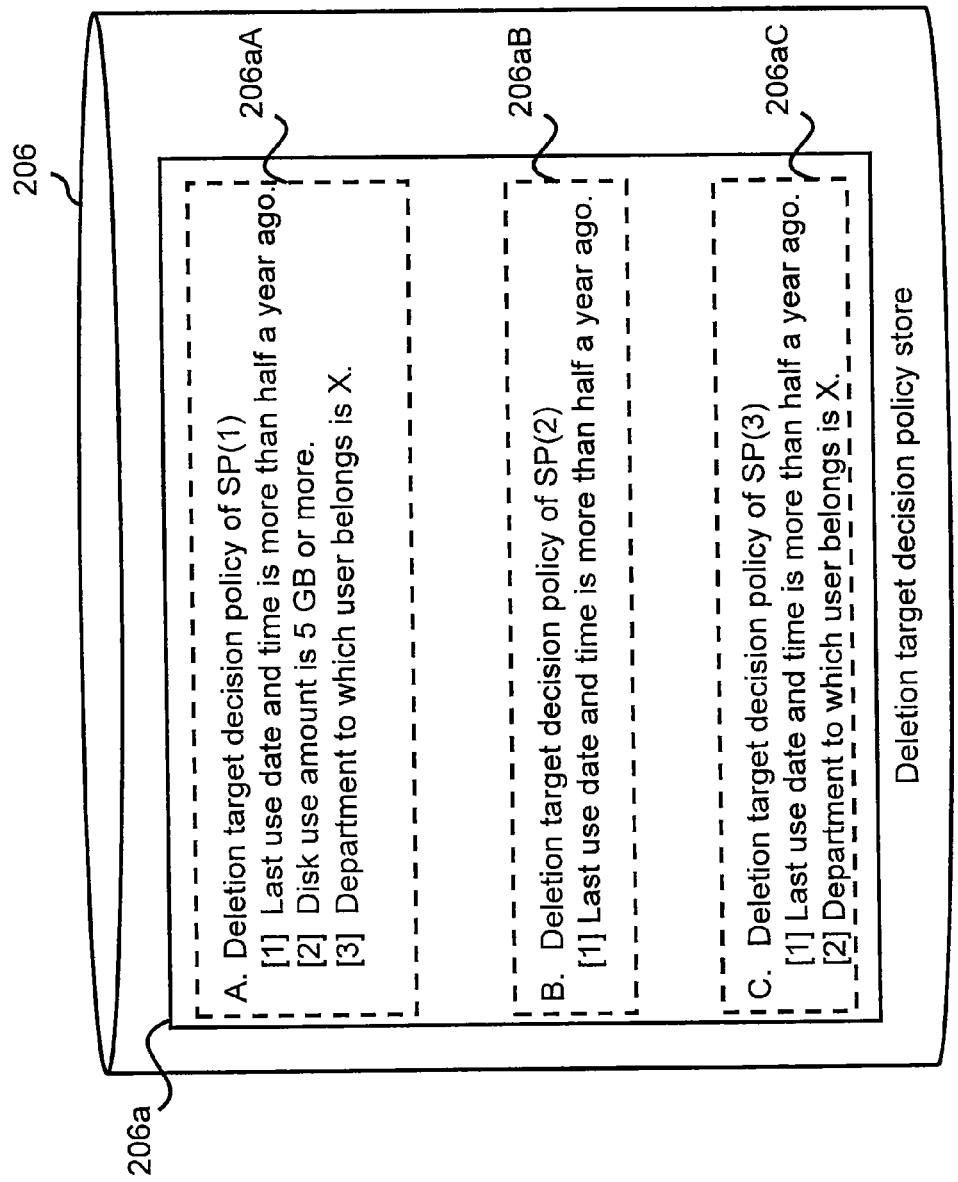
FIG. 6 is a schematic diagram for describing a deletion target decision policy store according to an embodiment.

The deletion target decision policy store (a deletion target policy storage unit) 206 is referred to by the service use status managing unit 212, and stores a deletion target decision policy as illustrated in FIG. 6. Specifically, the deletion target decision policy store (a deletion target decision policy storage unit) 206 stores a deletion target decision policy (deletion target decision policy information) 206a (206aA, 206aB, 206aC, and the like) representing the condition (a deletion target condition) of the user for which transmission permission of service data is deleted in the service provider device 300 identified by the service provider ID for each service provider ID as illustrated in FIG. 6.

For example, the deletion target decision policy 206a describes, as the deletion target condition, that the last use date and time of the user registered to the service provider SP(1) is more than half a year ago, that the disk use amount is 5 GB or more, and a department to which the user belongs is X. The deletion target decision policies of the service provider SP(2) and the service provider SP(3) are similarly described. For example, deletion of the transmission permission of the service data may be performed such that a deletion target account is deleted from an SP user repository which will be described later or such that a service data transmission permission state is changed to a temporary suspension state.

Figure 7:
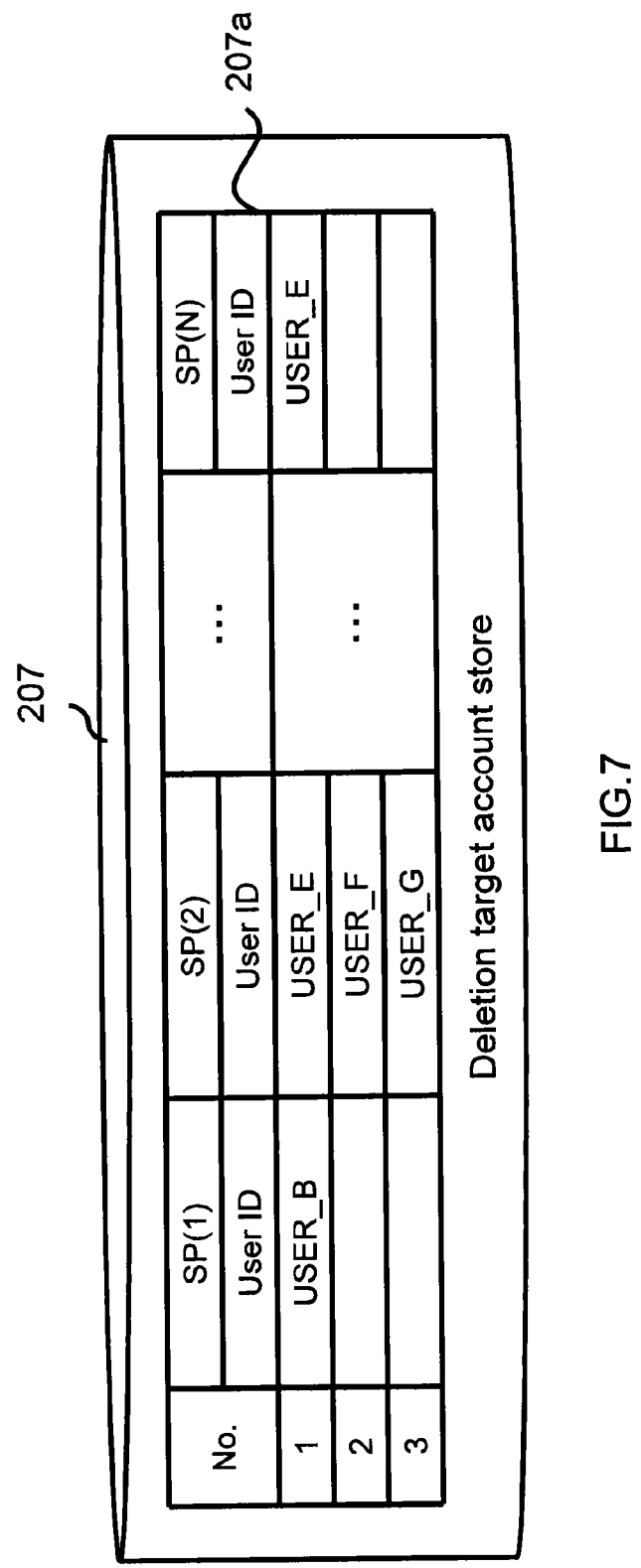
FIG. 7 is a schematic diagram for describing a deletion target account store according to an embodiment.

The deletion target account store (a deletion target account storage unit) 207 stores a deletion target account (deletion target account information) 207a which is decided based on the deletion target decision policy 206a, a service use status 202a, and the user attribute information 201a by the service use status managing unit 212 which will be described later as illustrated in FIG. 7. The deletion target account information 207a is a user ID of a deletion target in each service provider device 200.

The IDP authentication collaborating unit 208 has an ID provider function of the SSO (single sign-on). Specifically, for example, the IDP authentication collaborating unit 208 has the following functions (f208-1) to (f208-3).

(f208-1): a function of transmitting the log-in request to the user terminal 100 based on the address information of the user terminal 100 included in the user authentication request transmitted from the authentication collaboration handling unit 209 which will be described later, and executing the log-in process of performing authentication on user ID and the user authentication information received from the user terminal 100 based on the user ID and the password included in the IDP user repository 201.

Figure 8:
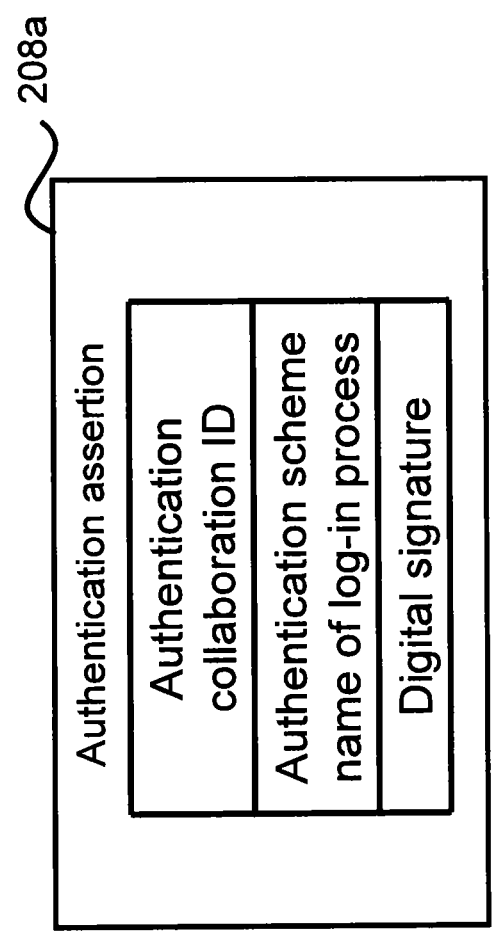
FIG. 8 is a schematic diagram for describing an authentication assertion according to an embodiment.

(f208-2): a function of generating a digital signature based on a signature generation key stored in the key storage unit 205 on an assertion context including the authentication collaboration ID issued by the IDP account provisioning unit 211 which will be described later and the authentication scheme name of the log-in process, and generating an authentication assertion 208a including the assertion context and the digital signature as illustrated in FIG. 8.

(f208-3): a function of transmitting the authentication collaboration response including the generated authentication assertion 208a to the service provider device 300 of the transmission source of an authentication collaboration request.

The authentication collaboration handling unit 209 receives the authentication collaboration request from the service provider device 300, and then handles a series of processes including a policy evaluation process, an account collaboration process, and an IDP authentication collaboration process which will be described later. Specifically, the authentication collaboration handling unit 209 includes the following functions (f209-1) to (f209-4).

(f209-1): a function of transmitting the user authentication request including the address information of the user terminal 100 included in the authentication collaboration request to the IDP authentication collaborating unit 208 when the authentication collaboration request including the service provider ID of the service provider device 300 and the address information of the user terminal 100 is transmitted and received from the service provider device 300.

(f209-2): a function of transmitting the policy evaluation request including the user ID used in the log-in process and the service provider ID included in the authentication collaboration request to the authentication collaboration policy evaluating unit 210 when the log-in process is successfully performed by the IDP authentication collaborating unit 208.

(f209-3): a function of transmitting the account collaboration request including the user ID and the service provider ID included in the policy evaluation request to the IDP account provisioning unit 211 when the determination result included in a policy evaluation response received from the authentication collaboration policy evaluating unit 210 represents permission.

(f209-4): a function of transmitting the IDP authentication collaboration execution request including the service provider ID and the user ID included in operation completion included in the account collaboration response transmitted from the IDP account provisioning unit 211 to the IDP authentication collaborating unit 208.

The authentication collaboration policy evaluating unit 210 receives the policy evaluation request from the authentication collaboration handling unit 209, and performs policy evaluation based on the authentication collaboration policy 203a which is defined in advance and the user use management table 202aA. Specifically, the authentication collaboration policy evaluating unit 210 has the following functions (f210-1) to (f210-5).

(f210-1): a function of reading the user attribute information 201a from the IDP user repository 201 based on the user ID included in the policy evaluation request transmitted from the authentication collaboration handling unit 209.

(f210-2): a function of reading the authentication collaboration policy information203a from the authentication collaboration policy store 203 based on the service provider ID included in the policy evaluation request transmitted from the authentication collaboration handling unit 209.

(f210-3): a function of reading the service use status information 202a from the IDP service use status store 202 based on the user ID included in the policy evaluation request transmitted from the authentication collaboration handling unit 209.

(f210-4): a transmission permission determining function of determining whether or transmission of service data is to be permitted according to whether or not the affiliation or appointment included in the read user attribute information 201a and the read service use status information 202a match the affiliation and appointment represented by the read authentication collaboration policy 203a.

(f210-5): a function of transmitting the policy evaluation response including the determination result to the authentication collaboration handling unit 209 of the transmission source of the policy evaluation request.

The IDP account provisioning unit 211 receives the account collaboration request from the authentication collaboration handling unit 209, and executes account provisioning on the service provider device 300. Specifically, for example, the IDP account provisioning unit 211 has the following functions (f211-1) to (f211-8).

(f211-1): a function of reading some item names of the user attribute from the SP user setting rule store 204 based on the service provider ID included in the transmitted account collaboration request.

(f211-2): a function of reading the deletion target account information 207a from the deletion target account store 207 based on the service provider ID included in the transmitted account collaboration request.

(f211-3): a function of acquiring item names matching corresponding some item names and user attribute partial information including an item value associated with the item name from the user attribute information 201a including the user ID matching the user ID in the IDP user repository 201 based on read some item names and the user ID included in an account collaboration request message.

(f211-4): a function of issuing the authentication collaboration ID shared between the service provider device 300 identified by the service provider ID included in the account collaboration request and the subject device 200.

(f211-5): a function of adding "account registration" to the acquired user attribute partial information as an operation instruction, adding "account deletion" serving as an operation instruction and the issued authentication collaboration ID to the acquired deletion target account information 207a, and generating an account provisioning request (an account collaboration request message).

(f211-6): a function of transmitting the account collaboration request message to the service provider device 300 of the transmission source of the authentication collaboration request.

(f211-7): a function of registering the authentication collaboration ID to the user attribute information 201a included in the IDP user repository 201 based on the service provider ID and the user ID included in the operation completion when an operation completion of an SP user repository 302 including the service provider ID of the service provider device and the user ID included in the user attribute partial information is notified from the service provider device 300 of the transmission source of the account collaboration request message.

(f211-8): a function of transmitting the account collaboration response representing the registration completion and the operation completion of the user repository to the authentication collaboration handling unit 209.

The service use status managing unit 212 includes a service use status acquiring unit 214 and a deletion target account deciding unit 215.

The service use status acquiring unit 214 transmits a use status acquisition request to the service provider device 300. Further, the service use status acquiring unit 214 acquires the use status of the service provider device 300 transmitted from the service provider device 300 based on the use status acquisition request, and updates the SPIDP service use status store 202 based on the acquired use status.

The deletion target account deciding unit 215 decides a deletion target account based on the acquired use status, the user attribute information 201a, and the deletion target decision policy 206aA.

When a predetermined time comes, the trigger 213 requests the service use status acquiring unit 214 of the service use status managing unit 212 to acquire the use status of the service provider device 300. In other words, the trigger 213 transmits a use status acquisition execution request to the service use status acquiring unit 212.

Upon receiving the use status acquisition execution request, the service use status acquiring unit 214 acquires the service use status from the service provider device 300. For example, the trigger 213 may be set according to a cycle. In other words, the trigger 213 may be an action that is performed at predetermined time intervals such as a re-connection action of an authentication session between the ID provider device 200 and the service provider device 300.

Meanwhile, the service provider device 300 provides a service used by the user, and includes a service data communicating unit 301, the SP user repository 302, a service data store 303, an SP service use status store 304, a verification policy store 305, an SP authentication collaborating unit 306, a service use status providing unit 307, and an SP account provisioning unit 308.

The service data communicating unit 301 has a function of transmitting an authentication token included in a service execution request and service data 303a in the service data store 303 which will be described later to the user terminal 100 based on the service execution request transmitted from the SP authentication collaborating unit 306 which will be described later.

Figure 9:
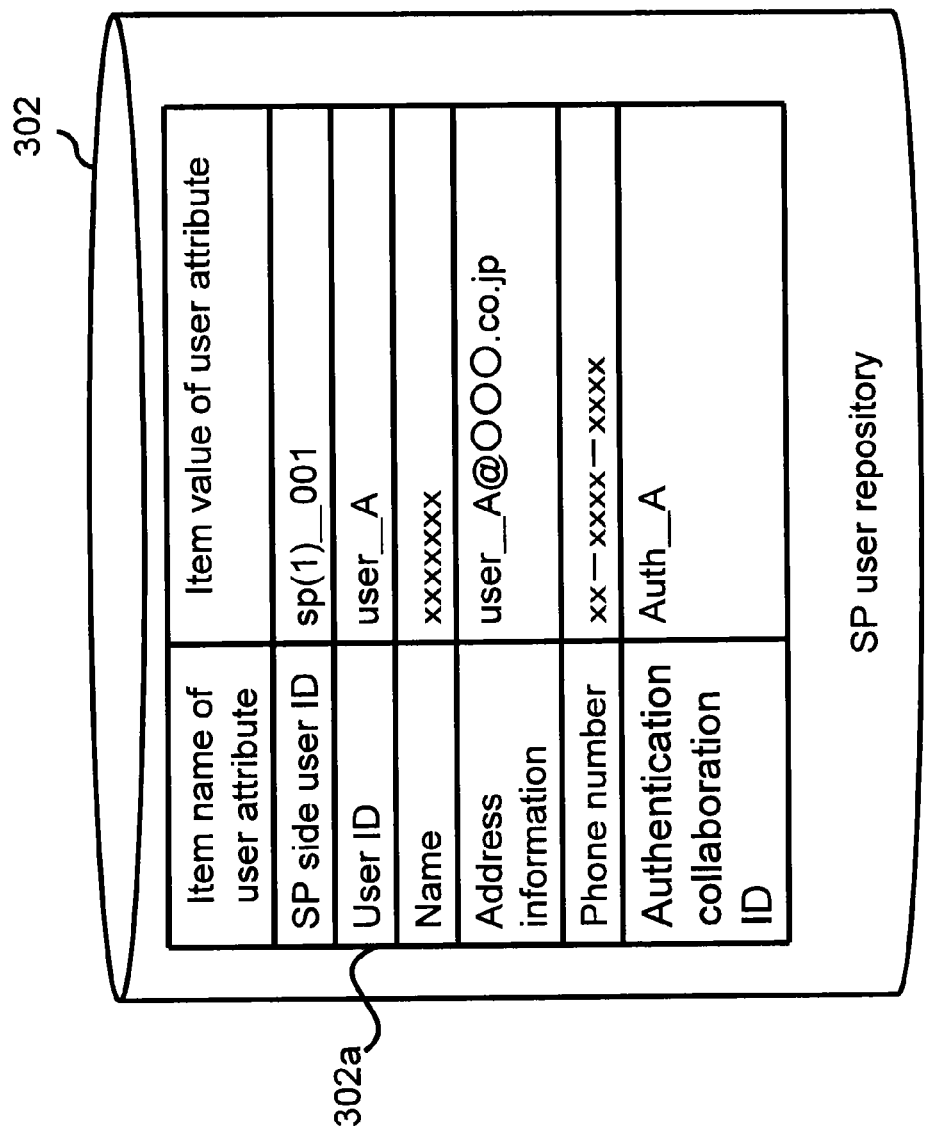
FIG. 9 is a schematic diagram for describing an SP user repository according to an embodiment.

The SP user repository 302 stores identity information of the user using the service data to be transmitted by the service data communicating unit 301. Specifically, the SP user repository (a user attribute partial information storage unit) 302 stores user attribute partial information 302a in which some item names are associated with item values based on the SP user setting rule 204a among item names and item values of the user attribute included in the user attribute information 201a in the IDP user repository 201 is associated with the SP side user ID identifying the user in the subject device 300 as illustrated in FIG. 9.

Figure 10:
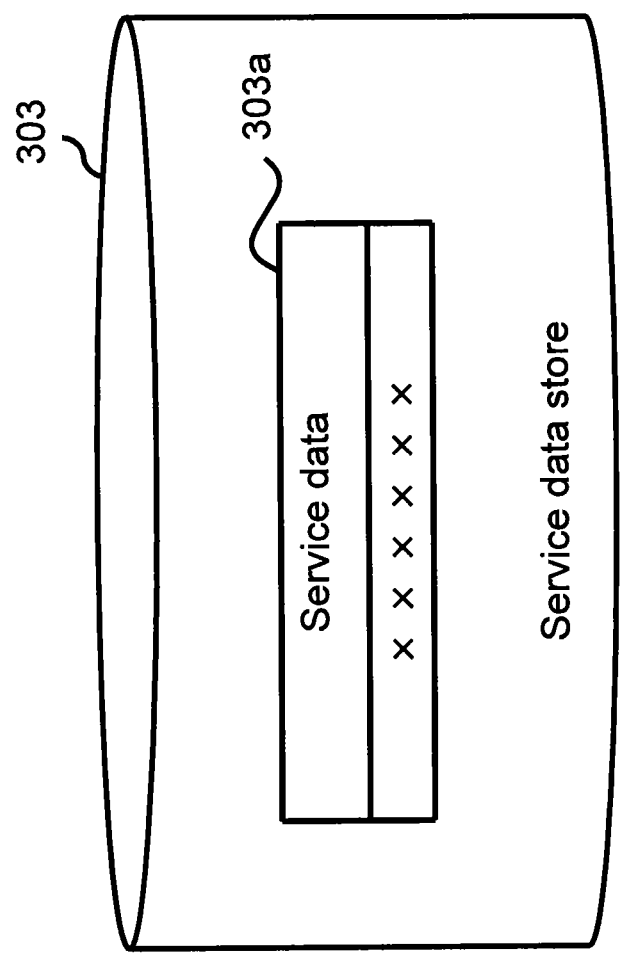
FIG. 10 is a schematic diagram for describing a service data store according to an embodiment.

The service data store 303 stores the service data 303a as illustrated in FIG. 10. The service data 303a is arbitrary data transmitted to the user terminal 100 as a target of service provision (service data transmission) by the service provider device 300.

The SP service use status store (a second service use status storage unit) 304 stores service use status information 304a which is a use status of a service provided by the service provider device 300 for each user.

In other words, the SP service use status store 304 stores the user use management table 202aA storing a service use status of each user at the service provider device 300 side and the in-use number management table 202aB.

Figure 11:
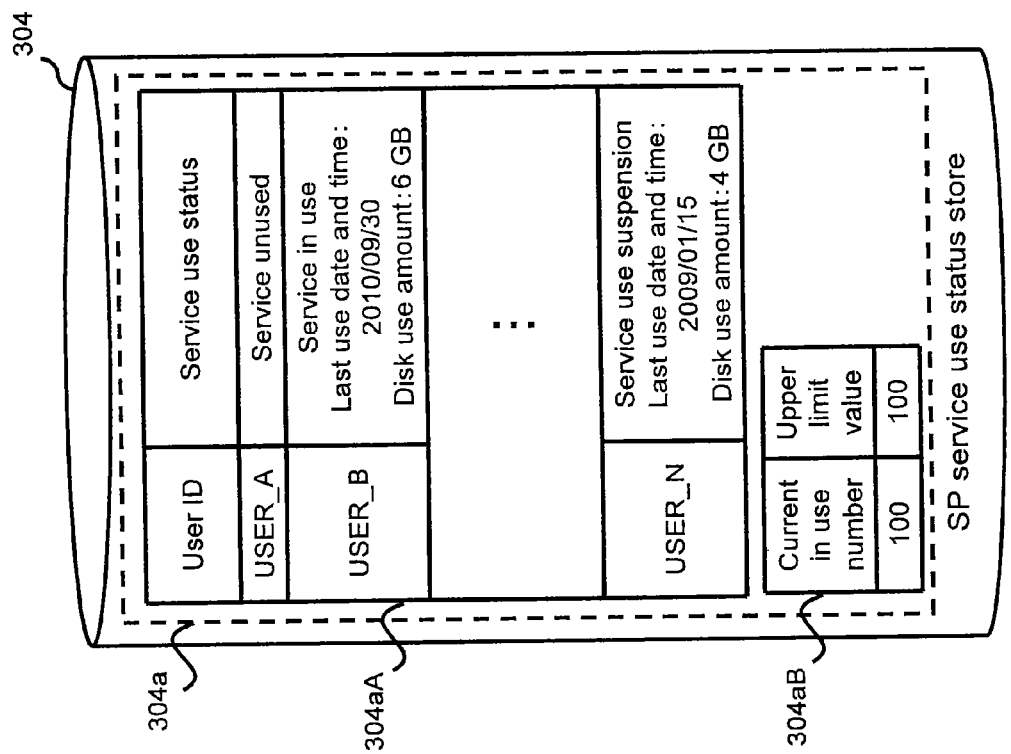
FIG. 11 is a schematic diagram for describing an SP service use status store according to an embodiment.

As illustrated in FIG. 11, the SP service use status store 304 stores a user use management table 304aA and an in-use number management table 304aB. The user use management table 304aA writes the use status of the service provider device 300 representing any one of "service in use" representing that transmission of the service data 303a is permitted, "service unused" representing that transmission of the service data 303a is not permitted, "service use suspension" representing temporary suspension of transmission permission of service data based on a temporary suspension request received from the user terminal 100, and "service use end" based on the use end request received from the user terminal 100 in association with the user ID.

Further, the use status of the service provider device 300 is stored in association with the last use date and time and the disk use amount of the user. In addition, the user use management table 304aA writes the use status of the user ID for each ID of the ID provider device when a plurality of ID provider devices 200 are provided.

The in-use number management table 202aB writes the in-use number representing the number of in-use services represented by the use status in the user use management table 304aA in association with an upper limit value of the in-use number which is set in advance as illustrated in FIG. 11.

Figure 12:
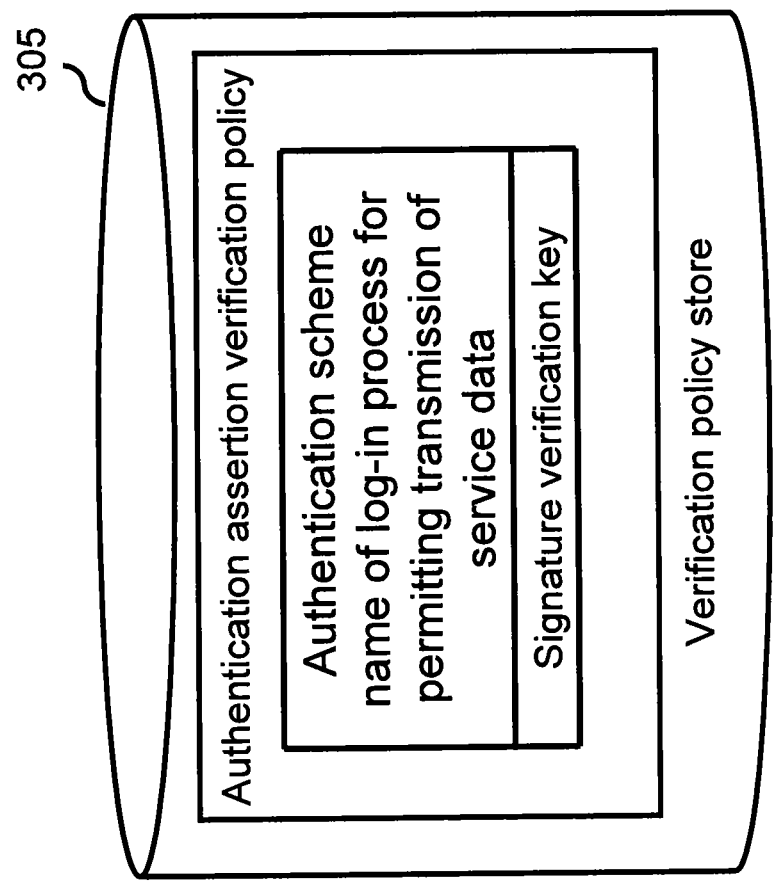
FIG. 12 is a schematic diagram for describing a verification policy store according to an embodiment.

The verification policy store 305 stores an authentication assertion verification policy including an authentication scheme name of the log-in process for permitting transmission of the service data 303a when the log-in process is successfully performed and a signature verification key corresponding to a signature generation key of the ID provider device 200 as illustrated in FIG. 12. As the signature verification key, for example, of a pair of the public key and the secret key in the public key cryptosystem, the public key may be used.

The SP authentication collaborating unit 306 has a service provider function of the SSO (single sign-on). Specifically, for example, the SP authentication collaborating unit 306 has the following functions (f306-1) to (f306-4).

(f306-1): a function of determining whether or not the service request includes the authentication token when the service request is received from the user terminal 100, transmitting the authentication token and the service data 303a in the service data store 303 to the user terminal 100 when it is determined that the service request includes the authentication token, and transmitting the authentication collaboration request including the service provider ID of the subject device 300 and the address information of the user terminal 100 to the ID provider device 200 when it is determined that the service request does not include the authentication token.

(f306-2): a verification function of verifying each of the authentication scheme name and the digital signature included in the authentication assertion 208a based on the authentication scheme name and the signature verification key in the authentication assertion verification policy in the verification policy store 305 when the authentication collaboration response is received from the ID provider device 200.

(f306-3): a function of issuing the authentication token when the verification result is all valid.

(f306-4): a function of transmitting the service execution request including the issued authentication token and the address information of the user included in the authentication collaboration response received from the ID provider device 200 to the service data communicating unit 301.

Upon receiving a use status acquisition request from the service use status acquiring unit 214 of the ID provider device 200, the service use status providing unit 307 has a function of searching the SP service use status store 304 based on the user ID included in the use status transmission request, and transmitting the use status of the service provider device 300 obtained by the search.

The SP account provisioning unit 308 performs account provisioning on the SP user repository 302 based on the account collaboration request message received from the IDP account provisioning unit 211 of the ID provider device 200. The SP account provisioning unit 308 updates the SP service use status store 304 based on the account collaboration request message.

Specifically, for example, the SP account provisioning unit 308 has the following functions (f308-1) to (f308-5).

(f308-1): a function of checking operation information included in the account collaboration request message when the account collaboration request message is received from the IDP account provisioning unit 211 of the ID provider device 200, issuing a new SP side user ID when the operation information is "account registration," and registering the issued SP side user ID and the user attribute partial information 302a included in the account collaboration request message to the SP user repository 302 in association with each other.

(f308-2): a function of searching the SP user repository 302 based on the user ID (the deletion target account) included in the account collaboration request message when the operation information included in the account collaboration request message is "deletion," and deleting the user attribute partial information 302a of the search result.

(f308-3): a function of searching the SP user repository 302 based on the user ID included in the account collaboration request message when the operation information included in the account collaboration request message is "update," and updating the user attribute partial information 302a of the search result. For example, the operation information "update" means account invalidity, and at this time, the SP account provisioning unit 308 searches the SP user repository 302 based on the user ID included in the account collaboration request message, and changes a valid flag (not illustrated) included in the user attribute partial information 302a of the search result to "false."

Further, the account invalidity may be included in the operation information "deletion."

(f308-4): a function of updating the SP service use status store 304 based on the user ID included in the account collaboration request message and the operation information after an operation of the user repository.

For example, when the operation information is "account registration," the user ID and the use status "service in use" are written in the user use management table 304aA as a new use status. At this time, when the corresponding user ID is present in the user use management table 304aA, the use status is updated.

Further, when the operation information is "deletion," the use status of the user ID written in the user use management table 304aA is changed to "service unused."

(f308-5): a function of notifying the ID provider device 200 which is the transmission source of the account collaboration request message of operation completion including the user ID included in the operated user attribute partial information 302a and the service provider ID of the subject device 300 and store update completion after an operation of the SP user repository 302 and update (an SP account operation) of the SP service use status store 304.

Next, an operation of the authentication collaboration system having the above-described configuration will be described with reference to FIGS. 13 to 23. The following description starts from a state in which a system environment in which the SSO is possible between the ID provider device 200 and the service provider device 300 is given, an account of the user belonging to an organization of the ID provider side is not registered to the service provider device 300, and authentication is not collaborated yet.

The description will proceed in connection with an example of a typical process in which in this state, when the user makes the service request, the ID provider device 200 determines whether or not the authentication collaboration policy 203a is satisfied, and when it is determined that the authentication collaboration policy 203a is satisfied, the user's account is registered to the service provider device 300 side, so that the SSO is executed between the ID provider device 200 and the service provider device 300, and the service data 303a is transmitted from the service provider device 300.

Figure 13:
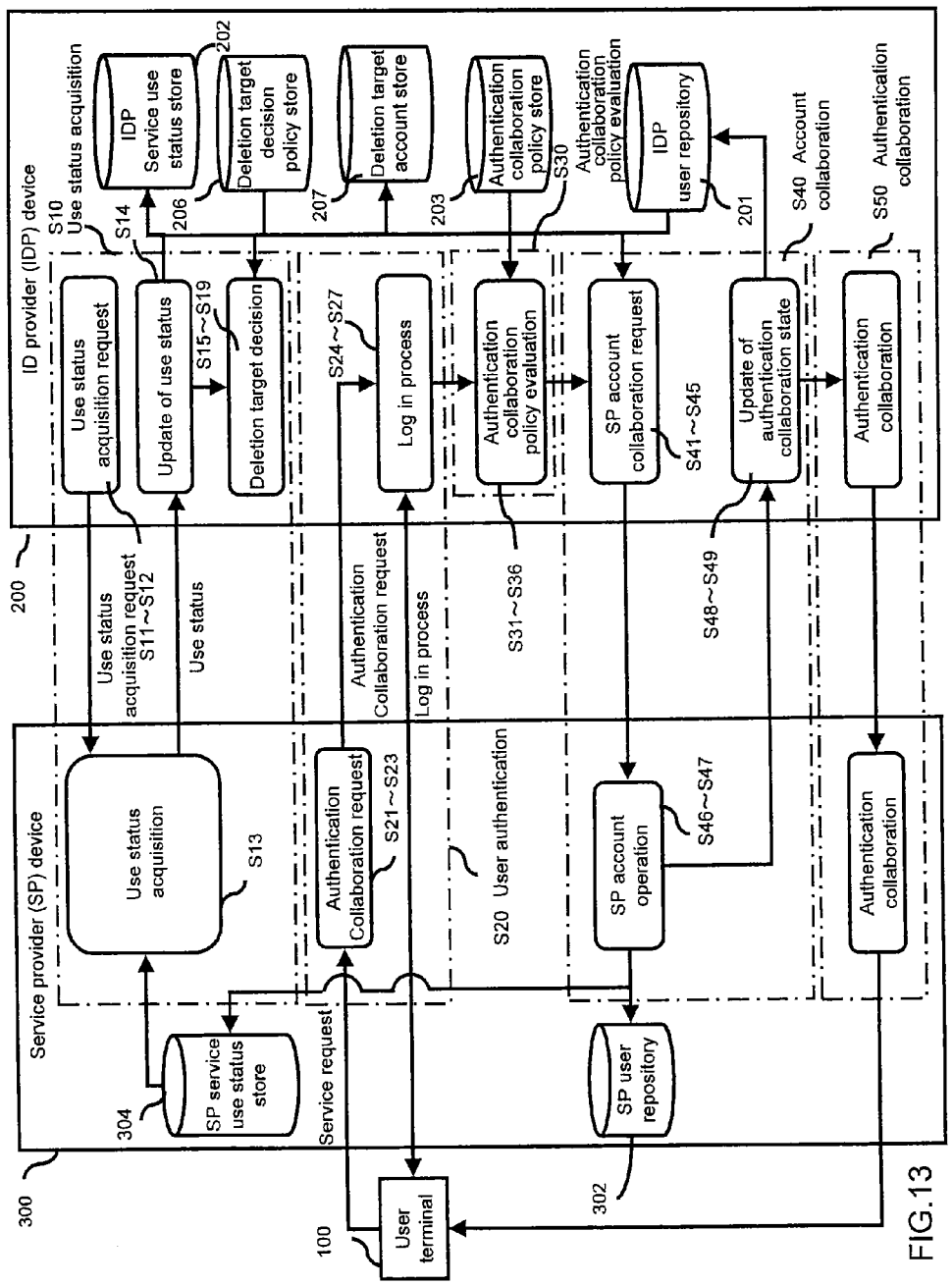
FIG. 13 is a schematic diagram illustrating an outline of an overall operation according to an embodiment.

Thereafter, the description will be divided into service use status acquisition (S11 to S19) of step S10, user authentication (S21 to S27) of step S20, authentication collaboration policy evaluation (S31 to S36) of step S30, account collaboration (S41 to S49) of step S40, and authentication collaboration (S51 to S58) of step S50 as illustrated in FIG. 13.

Figure 14:
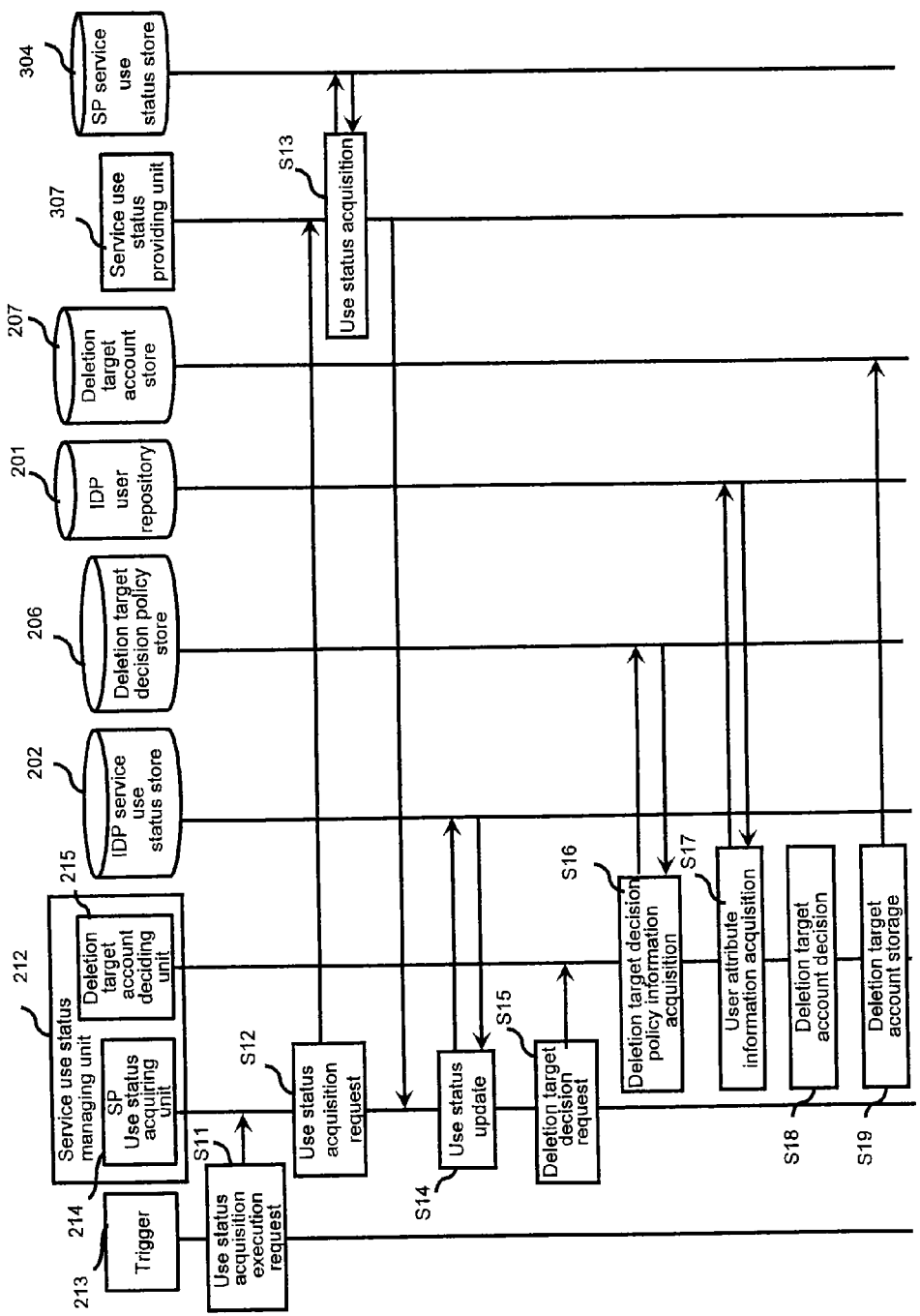
FIG. 14 is a sequence diagram illustrating the flow of a use status acquisition process according to an embodiment.
Figure 15:
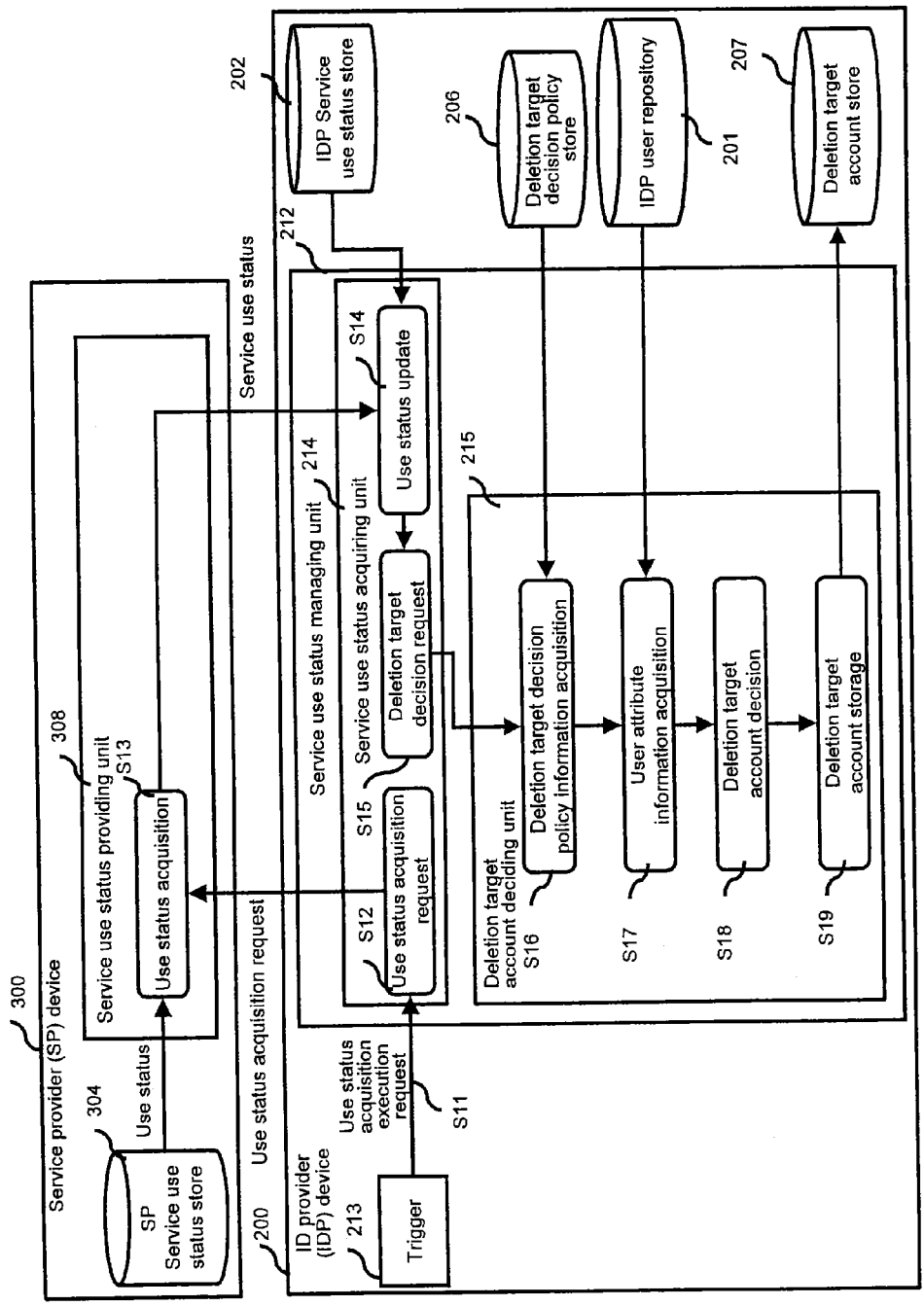
FIG. 15 is a block diagram illustrating an example of components necessary for a use status acquisition process according to an embodiment.

First, service use status acquisition of step S10 of FIG. 13 will be described with reference to a sequence diagram of FIG. 14 and a schematic diagram of FIG. 15.

In step S11, when a preset time comes, the trigger 213 of the ID provider device 200 requests the service use status managing unit 212 to execute use status acquisition. In the present embodiment, the trigger 213 is set to 12:00, Apr. 1, 2011.

In step S12, upon receiving the use status acquisition execution request from the trigger 213, the service use status acquiring unit 214 of the service use status managing unit 212 requests the service use status providing unit 307 of the service provider device 300 to acquire the use status. In the present embodiment, the user status acquisition request is assumed to be transmitted only to the service provider device 300 having the service provider ID of SP (1).

In step S13, the service use status providing unit 307 acquires the service use status information 304a from the SP service use status store 304 of each service provider device 300, and transmits the service use status information 304a to the service use status managing unit 212 of the ID provider device 200.

In step S14, the service use status acquiring unit 214 of the service use status managing unit 212 updates the IDP service use status store 202 based on the received service use status information 304a of each service provider device 300.

In step S15, when the SPIDP service use status store 202 is updated based on the received service use status information 304a, the service use status acquiring unit 214 transmits a deletion target decision request to the deletion target account deciding unit 215.

In step S16, upon receiving the deletion target decision request, the deletion target account deciding unit 215 acquires the deletion target decision policy 206a from the deletion target decision policy store 206.

In step S17, the deletion target account deciding unit 215 acquires the user attribute information 201a from the IDP user repository 201.

In step S18, the deletion target account deciding unit 215 decides an account of a deletion target based on the user use management table 202aA and the in-use number management table 202aB updated in step S14, the deletion target decision policy 206a acquired in step S16, and the user attribute information 201a acquired in step S17. Specifically, the deletion target account deciding unit 215 determines a user satisfying the deletion condition represented by the deletion target decision policy 206a based on the user attribute information 201a related to a predetermined user and the service use status of the user stored in the user use management table 202aA and the in-use number management table 202aB.

For example, an example in which the deletion target account deciding unit 215 determines the user satisfying the deletion condition represented by the deletion target decision policy 206a based on the deletion target decision policy 206aA of FIG. 6 and the user use management table 202aA and the in-use number management table 202aB of FIG. 3 will be described in detail. First, USER_B and USER_N satisfy a deletion condition [1] "last use date and time is more than half a year ago" in SP (1) of the deletion target decision policy 206aA.

Next, USER_B and USER_N satisfy a deletion condition [2] "disk use amount is 5 GB or more" in SP (1) of the deletion target decision policy 206aA. Next, USER_B satisfies a deletion condition [3] "department to which user belongs is X" in SP (1) of the deletion target decision policy 206aA. Thus, USER_B satisfies all of the deletion conditions represented by the deletion target decision policy 206a and thus is decided as the deletion target account. Further, when a plurality of deletion target accounts are present, all of the deletion target accounts are decided as the deletion target account.

In step S19, the deletion target account deciding unit 215 stores the decided deletion target account in the deletion target account store 207.

Figure 16:
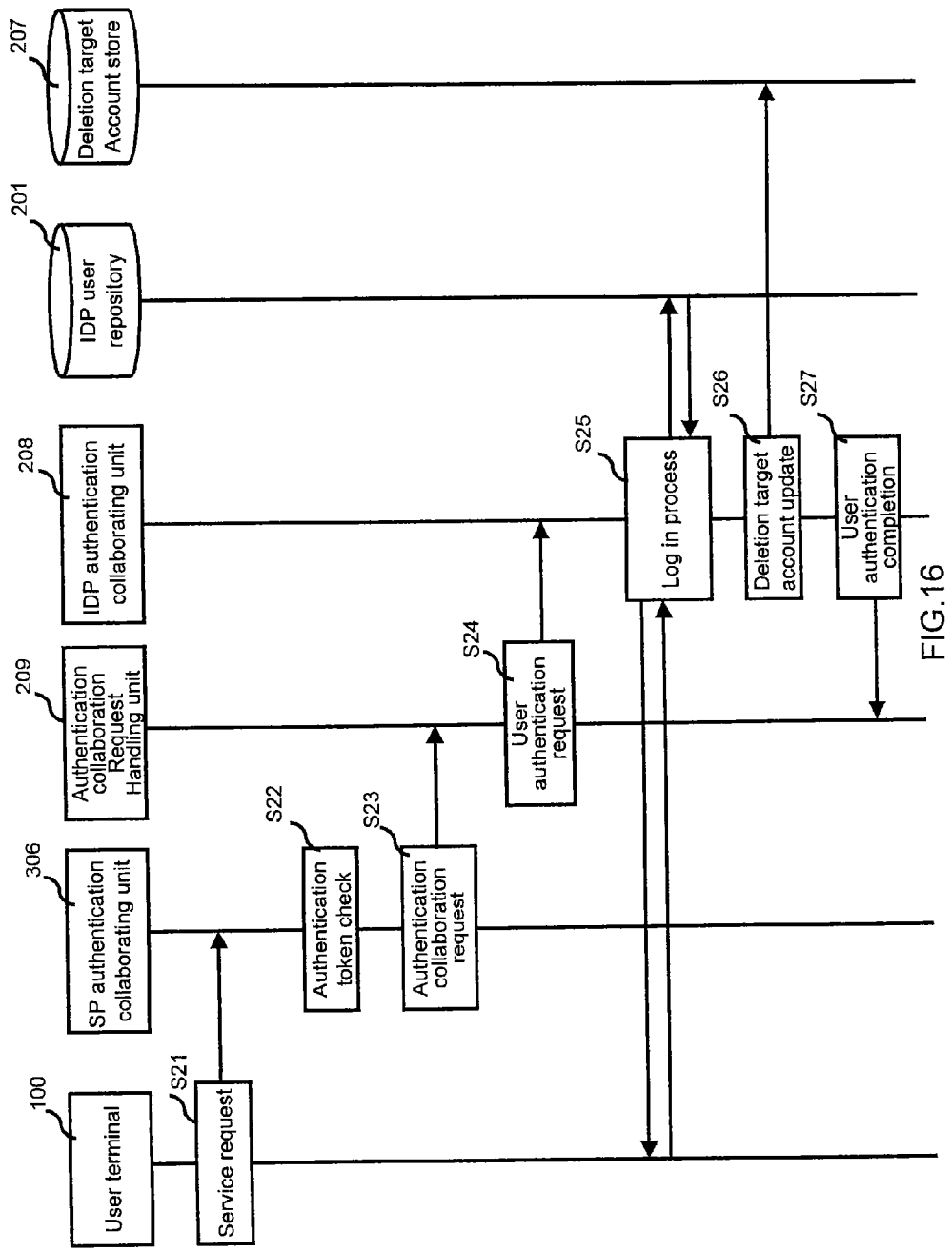
FIG. 16 is a sequence diagram illustrating the flow of a user authentication process according to an embodiment.
Figure 17:
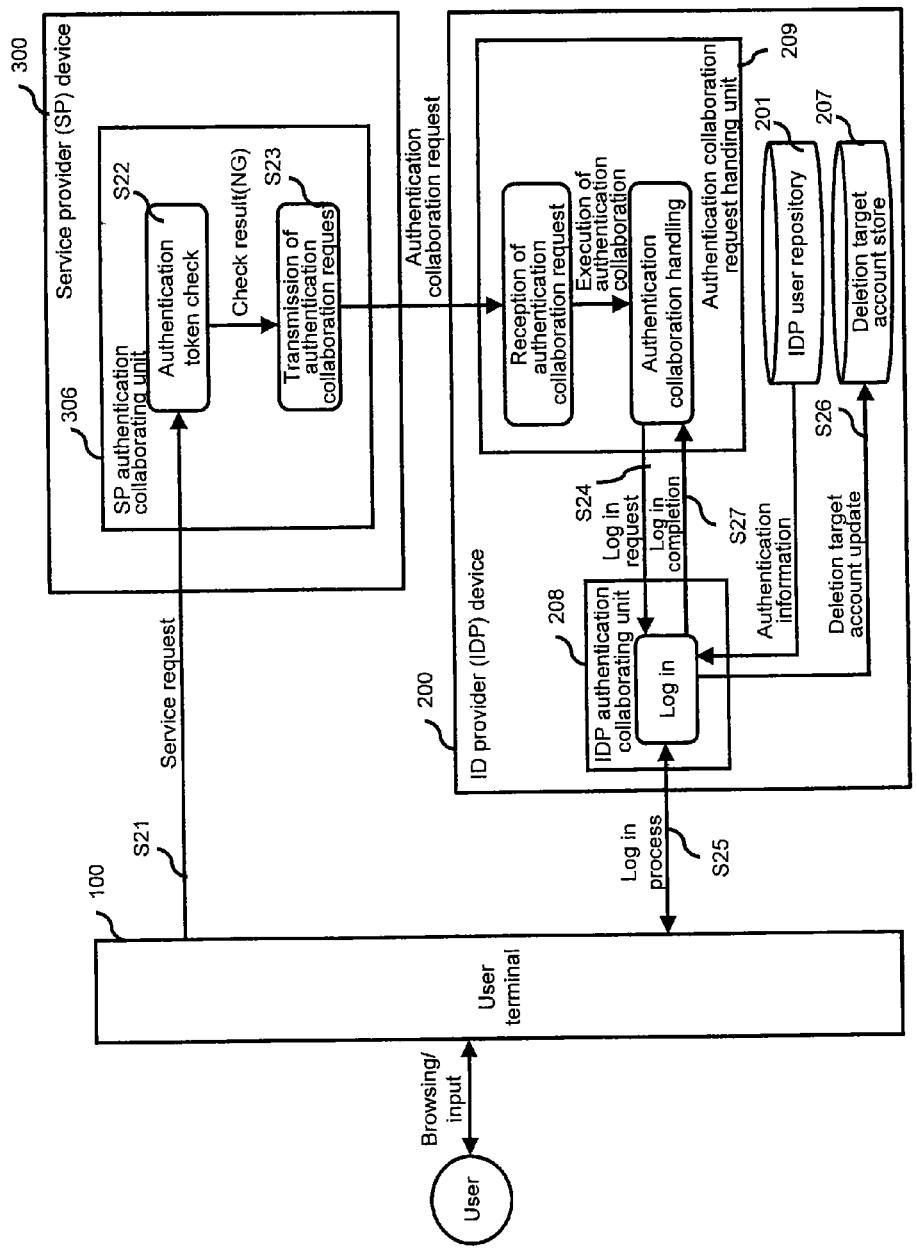
FIG. 17 is a block diagram illustrating an example of components necessary for a user authentication process according to an embodiment.
Figure 18:
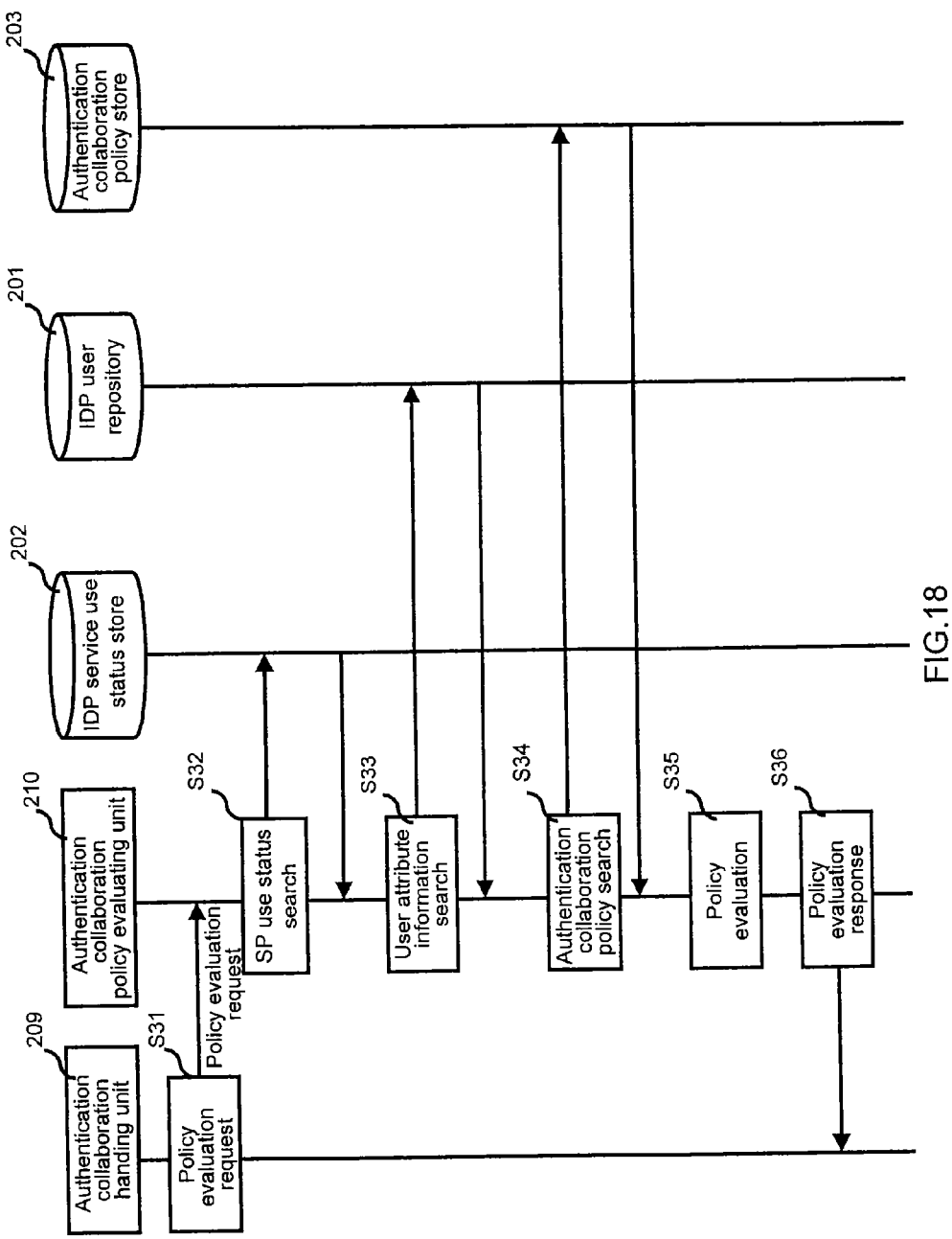
FIG. 18 is a sequence diagram illustrating the flow of an authentication collaboration policy evaluation process according to an embodiment.
Figure 19:
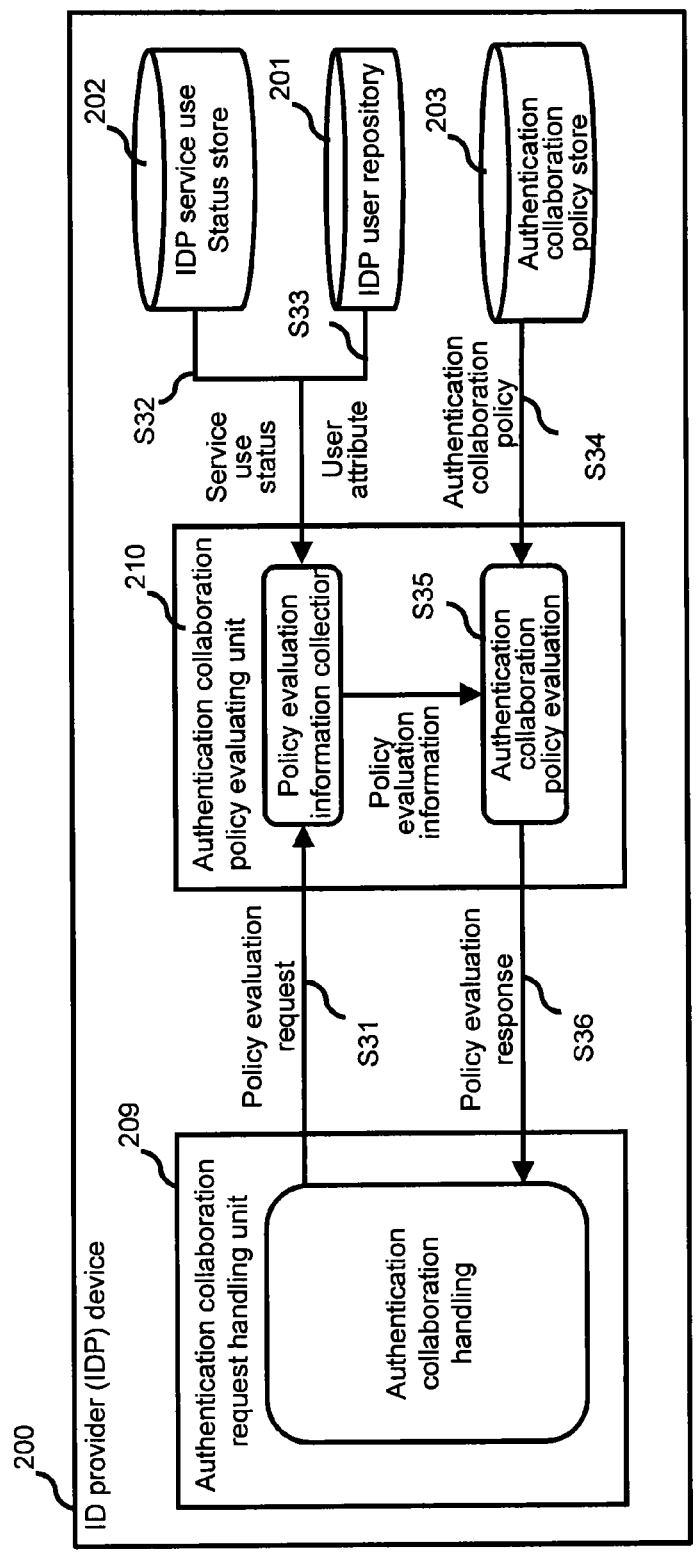
FIG. 19 is a block diagram illustrating an example of components necessary for an authentication collaboration policy evaluation process according to an embodiment.
Figure 20:
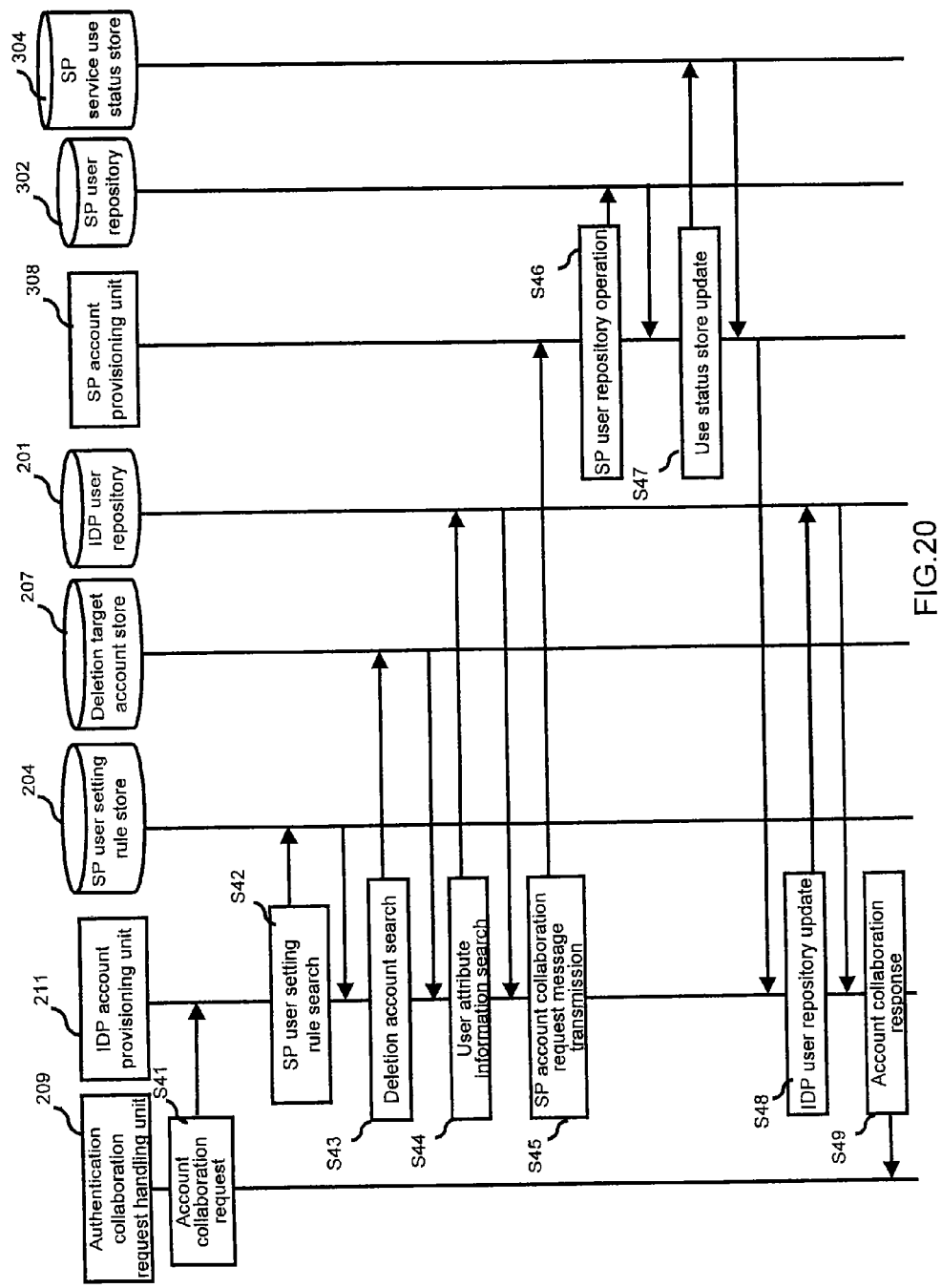
FIG. 20 is a sequence diagram illustrating the flow of an account collaboration process according to an embodiment.
Figure 21:
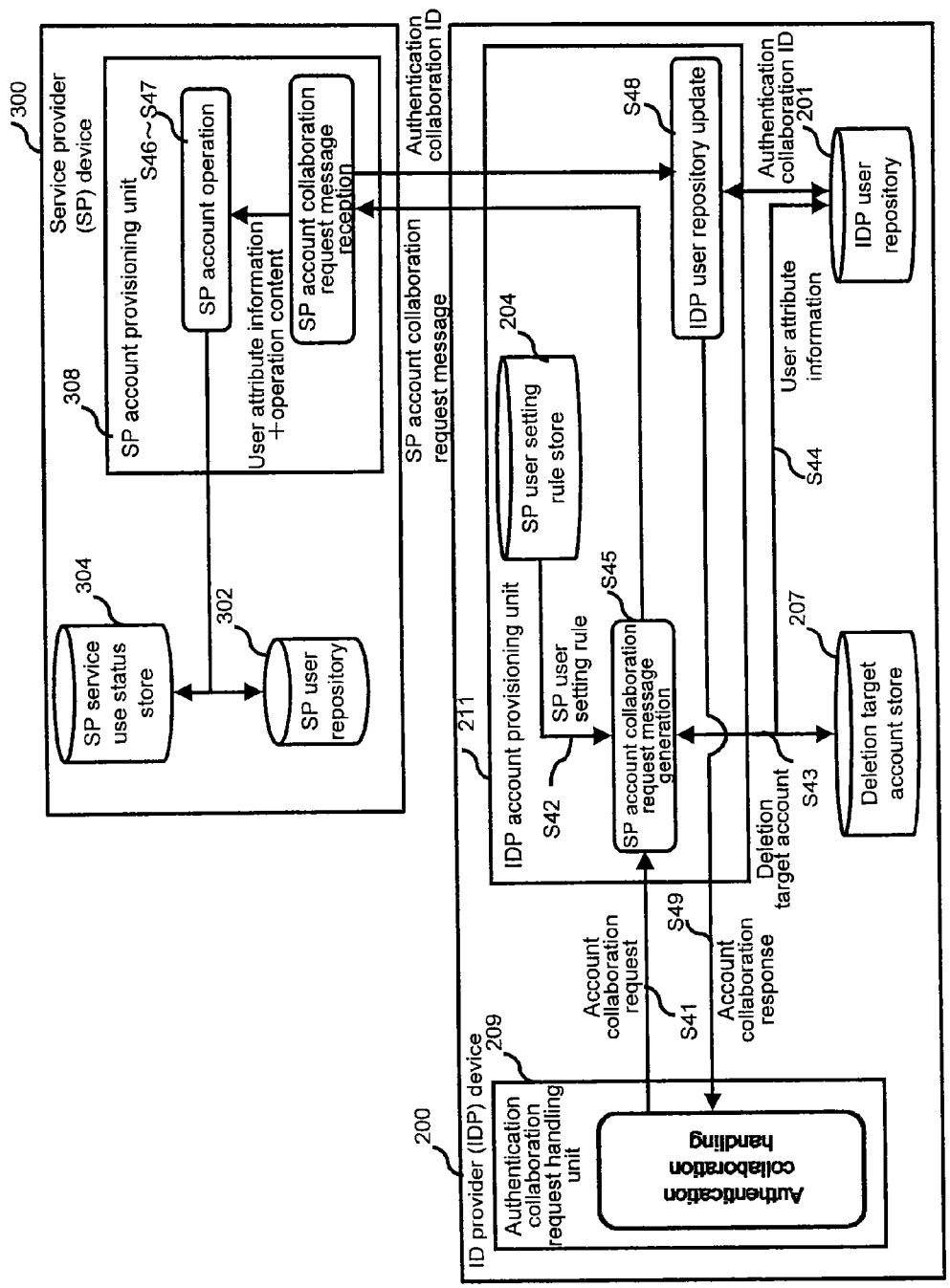
FIG. 21 is a block diagram illustrating an example of components necessary for an account collaboration process according to an embodiment.
Figure 22:
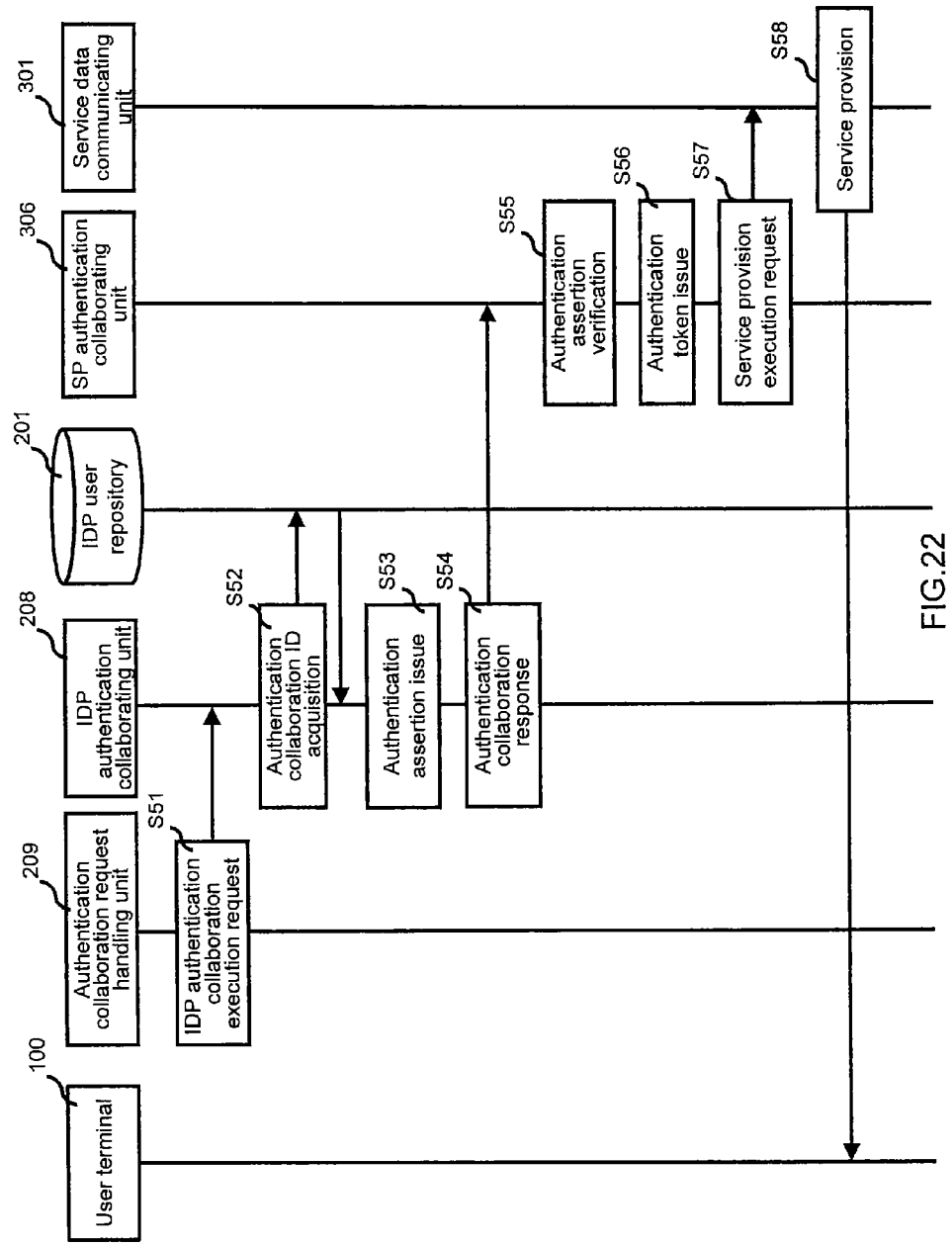
FIG. 22 is a sequence diagram illustrating the flow of an authentication collaboration process according to an embodiment.
Figure 23:
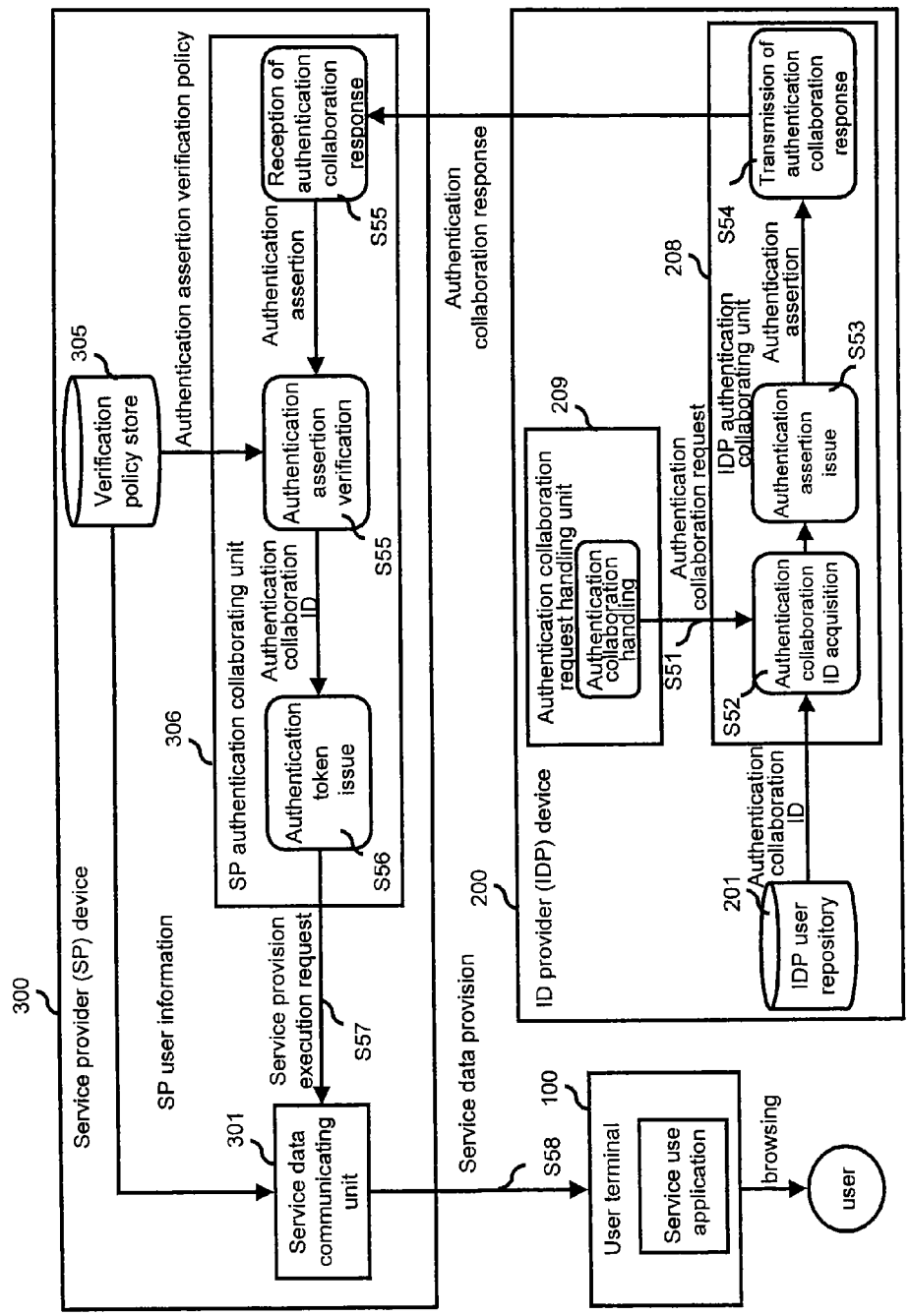
FIG. 23 is a block diagram illustrating an example of components necessary for an authentication collaboration process according to an embodiment.

Here, the user authentication of step S20 of FIG. 13 will be described with reference to a sequence diagram of FIG. 16 and a schematic diagram of FIG. 17. The user authentication of step S20 starts when user operates the user terminal in order to use a service of the service provider device 300 side.

In step S21, when the user operates the user terminal 100 in order to use a service of the service provider device 300 side, the user terminal 100 transmits the service request to the service provider device 300. The service provider device 300 catches the service request through the SP authentication collaborating unit 306 that undertakes access management.

In step S22, upon receiving the service request from the user, the SP authentication collaborating unit 306 determines whether or not the service request includes the authentication token. For example, when the service request from the user is a form of a HTTP request, it is checked whether or not the authentication token issued by the service provider device 300 is present in a cookie included in the HTTP request.

Further, when it is checked that the authentication token is present, that is, when authentication collaboration is finished, the service provider device 300 provides the user with a service requested through the service request. In other words, when it is determined that the service request includes the authentication token, the SP authentication collaborating unit 306 transmits the authentication token and the service data 303a in the service data store 303 to the user terminal 100 of the service request source through the service data communicating unit 301. Specifically, the SP authentication collaborating unit 306 transmits the service execution request including the authentication token in the service request and the user ID associated with the authentication token to the service data communicating unit 301.

Meanwhile, when it is determined in step S22 that the service request does not include the authentication token, that is, when authentication is not collaborated yet, step S23 is executed.

In step S23, the service provider device 300 transmits the authentication collaboration request to the ID provider device 200. At this time, the authentication collaboration request may be transmitted from the service provider device 300 to the ID provider device 200 directly or through redirecting of the user terminal 100. The authentication collaboration request includes the service provider ID of the subject device 300 and the address information of the user terminal 100.

Here, the service provider device 300 does not collaborate with the ID provider device 200 which is one ID provider, and thus selection of the ID provider is unnecessary. When the service provider device 300 collaborates with the ID provider device 200 which is one ID provider and so selection of the ID provider is necessary, the SP authentication collaborating unit 306 may transmit an IDP list (not illustrated) listing ID provider IDs representing an ID provider with which a relation of trust is established in advance to the user terminal 100 in order to cause the user to select the ID provider to which the user belongs. At this time, the user terminal 100 displays the IDP list received from the service provider device 300, and urges the user to select the ID provider to which the user belongs. Thereafter, the user terminal 100 transmits the selected ID provider ID to the service provider device 300 according to the user's operation.

In step S24, the authentication collaboration handling unit 209 of the ID provider device 200 analyzes a message directed to the ID provider device 200, starts an authentication collaboration process when it is checked that the message is the authentication collaboration request, and transmits the user authentication request including the address information of the user terminal 100 in the authentication collaboration request to the IDP authentication collaborating unit 208. However, when it is checked that the message is not the authentication collaboration request, the message is re-transmitted to a destination desired by the service provider device 300 through intervention of the authentication collaboration handling unit 209.

In step S25, upon receiving the user authentication request, the IDP authentication collaborating unit 208 executes the log-in process for identification and authentication of the user based on the user authentication request. In the log-in process, the IDP authentication collaborating unit 208 transmits the log-in request to the user terminal 100 based on the address information of the user terminal 100 included in the transmitted user authentication request, and authenticates the user ID and the user authentication information received from the user terminal 100 based on the user ID and the password in the IDP user repository 201. In the present embodiment, authentication is assumed to be performed based on a user ID "USER_A" and a password "PASS_A" received from the user terminal 100, and the user authentication is assumed to be successfully performed.

In step S26, the IDP authentication collaborating unit 208 determines whether or not account information of the user that has successfully logged in is present in the deletion target account store 207, and deletes the corresponding account from the deletion target account store 207 when information of the account that has successfully logged in is present. In the present embodiment, since "USER_A" does not remain registered to the deletion target account store 207, the deletion target account store 207 is not updated.

In step S27, when the log-in process of step S25 is successfully performed, the IDP authentication collaborating unit 208 transmits a user authentication completion (log-in completion) message including the user ID used in the log-in process and information representing authentication success to the authentication collaboration handling unit 209.

Through the above process, the user authentication (S21 to S27) of step S20 ends.

Next, in the authentication collaboration policy evaluation of step S30, after the user authentication ends, authentication collaboration policy evaluation is performed using the user use management table 202aA, the in-use number management table 202aB, the user attribute information 201a, and the authentication collaboration policy 203a as input values, and permission is given on the service request of the user. Thereafter, the authentication collaboration policy evaluation of step S30 will be described with reference to a sequence diagram of FIG. 18 and a schematic diagram of FIG. 19.

In step S31, the authentication collaboration handling unit 209 analyzes the user authentication completion message transmitted in step S27, and checks that the log-in process has been successfully performed. When the log-in process has been successfully performed, the authentication collaboration handling unit 209 transmits the policy evaluation request on the user's service request to the authentication collaboration policy evaluating unit 210. The policy evaluation request includes the user ID acquired in the log-in process of step S25, that is, the user's IDP account and the service provider ID in the authentication collaboration request.

Thereafter, through steps S32 to S34, the authentication collaboration policy evaluating unit 210 collects information necessary for evaluation of the authentication collaboration policy 203a.

In step S32, the authentication collaboration policy evaluating unit 210 reads the service use status 202a from the IDP service use status store 202 based on the user ID and the service provider ID included in the policy evaluation request. However, step S32 is not performed when static policy evaluation is executed.

Hereinafter, the user ID read in step S32 is assumed to be USER_A, and the service provider device 300 requested by the user is assumed to be SP (1).

In step S33, the authentication collaboration policy evaluating unit 210 reads the user attribute information 201a from the IDP user repository 201 based on the user ID included in the policy evaluation request.

In step S34, the authentication collaboration policy evaluating unit 210 reads the authentication collaboration policy 203a from the authentication collaboration policy store 203 based on the service provider ID included in the policy evaluation request. In the present embodiment, among the authentication collaboration policies 203a of FIG. 4, a first authentication collaboration policy (a policy when SP (1) is used) 203aA related to A in FIG. 4 is read as a search result.

In step S35, when static policy evaluation is executed, the authentication collaboration policy evaluating unit 210 performs the policy evaluation process of determining whether or not transmission of the service data 303a is to be permitted according to whether or not an affiliation and appointment included in the user attribute information 201a read in step S33 match an affiliation and appointment represented by the authentication collaboration policy 203aA read in step S34.

However, when active policy evaluation is executed using the user use management table 202aA of step S32, policy evaluation is executed based on the service use status 202a, the user attribute information 201a, and the authentication collaboration policy 203aA acquired through steps S32, S33, and S34.

For example, policy evaluation of step S35 will be described in connection with the use of SP (1) represented by the authentication collaboration policy 203aA. The service use conditions of [1] to [4] are defined in the authentication collaboration policy 203aA in advance ([4] is not defined in case of static policy evaluation), and it is checked whether or not the collected user use management table 202aA and the user attribute information 201a all satisfy the service use conditions as follows. As a result, permission is given on the user's service request.

[1] of the authentication collaboration policy 203aA: the authentication collaboration policy 203a represents that a department to which the user belongs is X. To this, as illustrated in FIG. 2, a department of USER_A in the user attribute information 201a is "X department." Thus, USER_A satisfies the condition of [1] in the authentication collaboration policy 203a.

[2] of the authentication collaboration policy 203aA: the authentication collaboration policy 203a represents that a division to which the user belongs is Y. To this, as illustrated in FIG. 2, a division of USER_A in the user attribute information 201a is "Y division." Thus, USER_A satisfies the condition of [2] in the authentication collaboration policy 203a.

[3] of the authentication collaboration policy 203aA: the authentication collaboration policy 203a represents that the user's appointment is an appointment of Z or more. To this, as illustrated in FIG. 2, an appointment of USER_A in the user attribute information 201a is "Z appointment." Thus, the condition of [3] in the authentication collaboration policy 203a is satisfied.

[4] of the authentication collaboration policy 203aA: the authentication collaboration policy 203a represents that the number of in-use accounts is not larger than an upper limit value. To this, as illustrated in FIG. 3, the current in-use number of SP (1) in the in-use number management table 202aB is 10 and not larger than the upper limit value, that is, 100. Thus, the condition of [4] in the authentication collaboration policy 203a is satisfied.

As described above, authentication collaboration policy evaluation on the user's service request is performed using the user use management table 202aA, the in-use number management table 202aB, and the user attribute information 201a based on the authentication collaboration policy 203a which is defined in advance. Further, when it is checked that any one of the above conditions is not satisfied, the authentication collaboration policy evaluation result becomes rejection.

In other words, the authentication collaboration policy evaluating unit 210 determines whether or not transmission of service data is to be permitted according to whether or not the read user attribute information 201a, the type of service that the user desires to use, an operation of service that the user desires to make, and the user's environmental condition when a service is executed are suitable for the read authentication collaboration policy 203a.

In step S36, the authentication collaboration policy evaluating unit 210 transmits the policy evaluation result including the determination result of step S35 to the authentication collaboration handling unit 209 as the policy evaluation response. Through the above process, the authentication collaboration policy evaluation (S31 to S36) of step S30 ends.

In the account collaboration of step S40, based on the policy evaluation response (in case of permission of service data transmission) acquired by the authentication collaboration policy evaluation of step 30, the user's account is generated on the SP user repository 302 of the service provider device 300, and account collaboration necessary as the advance preparation of the SSO is realized between the ID provider device 200 and the service provider device 300. Hereinafter, the description will proceed with reference to a sequence diagram of FIG. 20 and a schematic diagram of FIG. 21.

In step S41, the authentication collaboration handling unit 209 checks the policy evaluation result included in the policy evaluation response transmitted in step S36, and transmits the account collaboration request including the user ID and the service provider ID in the policy evaluation request to the IDP account provisioning unit 211 when the policy evaluation response represents permission on the service request. Further, when the policy evaluation response represents rejection on the service use, information representing service use rejection is transmitted to the user terminal 100. Here, steps S42 to 49 will be described in connection with an example in which the policy evaluation response represents permission.

In step S42, the IDP account provisioning unit 211 reads the user setting rule 204a from SP user setting rule store 204 based on the service provider ID (here, SP (1)) included in the received account collaboration request. For example, the user setting rule 204a is an item name (some item names of the user attribute) of a necessary user attribute or the like obtained for each the service provider device 300 when the ID provider device 200 performs account registration on the service provider device 300. Here, the IDP account provisioning unit 211 is assumed to read some item names of the user attribute as the user setting rule 204a.

In step S43, the IDP account provisioning unit 211 searches a deletion target account related to SP (1) from the deletion target account store 207.

Further, it is determined whether or not the number of users of the service provider ID (here, SP (1)) in the account collaboration received in the service use status information acquired from the IDP service use status store 202 by the authentication collaboration policy evaluating unit 210 in step S32 reaches the upper limit, and when the number of users of SP (1) reaches the upper limit, the search of step S43 may be performed. At this time, when the static policy evaluation is executed in step S32 and the service use status acquisition is not performed, the IDP provisioning unit 211 acquires the service use status from the IDP service use status store 202 before step S43.

In the present embodiment, since USER_B remains registered to the deletion target account store 207 as the deletion target account related to SP (1) as illustrated in FIG. 7, USER_B is here the search result. Further, when a plurality of deletion target accounts are present, one user ID may be deleted, or all user IDs may be deleted.

In step S44, based on some item names read in step S42 and the user ID included in the account collaboration request, the IDP account provisioning unit 211 acquires necessary user attribute information (hereinafter, referred to as "user attribute partial information) including item names matching some item names and item values associated with the corresponding item names from the user attribute information 201a including the user ID matching the user ID in the IDP user repository 201.

In step S45, the IDP account provisioning unit 211 generates an SP account collaboration request message by adding "account registration" to the user attribute partial information acquired in step S44 as an operation instruction and adding a "deletion" instruction to the deletion target account acquired in step S43 as an operation instruction, and transmits the generated account collaboration request message to the SP account provisioning unit 308 of the service provider device 300. The IDP account provisioning unit 211 issues an authentication collaboration ID and includes the authentication collaboration ID in the account collaboration request message.

For example, the operation instruction included in the account collaboration request message is an operation type of the SP user repository 302 based on an operation interface opened by the SP account provisioning unit 308, and includes deletion, account registration, account update, and the like. In the present embodiment, since the user's account does not remain registered to the service provider device 300 side, in step S45, "account registration" is designated as the operation instruction.

Further, the IDP account provisioning unit 211 issues the authentication collaboration ID shared between the service provider device 300 to which the SP account collaboration request message is transmitted and the subject device 200, and includes the authentication collaboration ID in the SP account collaboration request message.

In step S46, the SP account provisioning unit 308 operates the SP user repository 302 based on the received account collaboration request message. Specifically, when the operation instruction included in the received account collaboration request message is "account registration," the SP account provisioning unit 308 newly issues an SP side user ID (the user ID of the service provider device 300 side), and registers the SP side user ID and the user attribute partial information included in the SP account collaboration request message to the SP user repository 302 in association with each other. At this time, the SP account provisioning unit 308 also registers the authentication collaboration ID included in the account collaboration request message.

In step S46, when the operation instruction is "deletion," the SP account provisioning unit 308 searches the user attribute partial information 302a in the SP user repository 302 based on the deletion target account included in the account collaboration request message, and deletes the user attribute partial information 302a including the user ID matching the deletion target account.

In step S47, the SP account provisioning unit 308 updates the SP service use status store 304 based on the received account collaboration request message. Specifically, when the operation instruction included in the received account collaboration request message is "account registration," the SP account provisioning unit 308 registers the user ID included in the user attribute partial information in the account collaboration request message, the service use status "service in use," the last use date and time, and the disk use amount to the user use management table 304aA of the SP service use status store 304 in association with one another, counts the number of user IDs of "service in use", and updates the current in-use number of the in-use number management table 304aB.

Further, when the operation instruction included in the received account collaboration request message is "deletion," the SP account provisioning unit 308 searches the SP service use status store 304 based on the deletion target account included in the account collaboration request message, and changes the service use status included in the service use status information 304a of the search result to "service use suspension."

After the user repository operation of step S46 and the update of the service use status store 202 of step S47, the SP account provisioning unit 308 notifies the ID provider device 200 which is the transmission source of the account collaboration request message of the operation completion including the registered user ID in the user attribute partial information 302a and the service provider ID of the subject device. Specifically, the IDP account provisioning unit 211 of the ID provider device 200 is notified of the operation completion.

In step S48, the IDP account provisioning unit 211 registers the authentication collaboration ID issued in step S45 to a USER_A record of the IDP user repository 201a.

In step S49, the IDP account provisioning unit 211 transmits the account collaboration response representing the operation completion notified in step S47 to the authentication collaboration handling unit 209.

Through the above-described process, the account collaboration (S41 to S49) of step S40 ends.

In the authentication collaboration of step S50, after the account collaboration ends, the authentication collaboration, that is, the SSO is performed between the ID provider device 200 and the service provider device 300. Hereinafter, the authentication collaboration of step S50 will be described with reference to a sequence diagram of FIG. 22 and a schematic diagram of FIG. 23.

In step S51, the authentication collaboration handling unit 209 analyzes the authentication result included in the account collaboration response notified in step S49. When there is not a problem in the result, the authentication collaboration handling unit 209 transmits the authentication collaboration execution request including the service provider ID and the user ID included in the operation completion of the account collaboration response to the IDP authentication collaborating unit 208.

In step S52, upon receiving the authentication collaboration execution request, the IDP authentication collaborating unit 208 searches the IDP user repository based on the user ID included in the authentication collaboration execution request, and acquires the authentication collaboration ID.

In step S53, the IDP authentication collaborating unit 208 generates an assertion context including the authentication collaboration ID acquired in step S52 and the authentication scheme name of the log-in process performed in step S25. Further, the IDP authentication collaborating unit 208 generates a digital signature on the assertion context based on the signature generation key in the key storage unit 205. In addition, the IDP authentication collaborating unit 208 generates the authentication assertion 208a including the assertion context and the digital signature.

In step S54, the IDP authentication collaborating unit 208 transmits the authentication collaboration response including the generated authentication assertion 208a and the user ID included in the received authentication collaboration execution request to the service provider device 300 of the transmission source of the authentication collaboration request. The authentication collaboration response is received by the SP authentication collaborating unit 306 of the service provider device 300.

In step S55, the SP authentication collaborating unit 306 verifies each of the authentication scheme name included in the authentication assertion 208a and the digital signature based on the authentication scheme name and the signature verification key in the authentication assertion verification policy 306. As a result, the SP authentication collaborating unit 306 determines whether or not the authentication result of the ID provider device 200 is reliable based on the authentication assertion 208a issued by the ID provider device 200, and determines whether or not service data transmission (service provision) to the user is to be permitted. In the present embodiment, the verification result is assumed to be valid, and it is decided that service data transmission is permitted.

In step S56, when permission is decided in step S55, the SP authentication collaborating unit 306 issues the authentication token. The authentication token may be stored in a temporary storage unit (not illustrated) of the service provider device 300 in association with the authentication collaboration ID and the user ID.

In step S57, the SP authentication collaborating unit 306 transmits the service execution request including the authentication token issued in step S56 and the user ID associated with the authentication token using the authentication collaboration ID to the service data communicating unit 301.

In step S58, the service data communicating unit 301 transmits the authentication token in the service execution request and the service data 303a in the service data store 303 to the user terminal 100 based on the transmitted service execution request.

As described above, according to the authentication collaboration system of the present embodiment, the authentication collaboration handling unit 209 arranged in the ID provider device 200 intercepts the authentication collaboration request from the service provider device 300 on the service request from the user to the service provider device 300, and determines whether or not the service data 303a is to be transmitted based on the authentication collaboration policy 203a which is defined in advance. Then, when the determination result represents permission, the user's account is generated on the SP user repository 302 managed in the service provider device 300 using the user attribute information 201a managed in the ID provider device 200. Thereafter, each of the ID provider device 200 and the service provider device 300 performs the authentication collaboration process of the related art, and a desired service is provided from the service provider device 300 to the user.

In addition, in the authentication collaboration system of the related art, the service provider checks that information sufficient to register an account is not held and requests the ID provider to provide an insufficient user attribute, and thus a great deal of time and effort is required, and the checking and requesting are manually performed. However, in the authentication collaboration system of the present embodiment, due to the configuration in which the authentication collaboration policy 203a is stored in advance, the checking and requesting are not manually performed as in the related art.

Further, in the authentication collaboration system of the present embodiment, the use status acquisition process of acquiring the use status of the service provider device 300 by the ID provider device 200, which generally takes a long time, is not performed at a timing of the SSO but performed in advance. Thus, the standby time when the user logs in does not increase, and the user's burden can be reduced. Further, since the decision of the deletion target account is performed in advance, the user's burden can be further reduced.

Thus, even in a state in which the user's account does not remain registered to the service provider device 300 side, it is automatically determined whether or not the service data 303a is to be transmitted based on the authentication collaboration policy 203a defined in advance at the ID provider device 200 side at the user's service request, that is, at an SSO execution timing. Thus, it is possible to provide the user with a seamless service use without requiring a manual operation and taking a long time.

Further, according to the authentication collaboration system of the present embodiment, in the service use provided under the distributed environment such as the Internet, a series of processes from the service use request to the SSO (single sign-on) are automated based on the service use policy and the service use status which are defined in advance, and thus the user can smoothly start the service use.

The exemplary embodiments of the present invention have been described above, but the above embodiments are merely examples, and do not intend to limit the scope of the invention. The novel embodiments can be implemented in various forms, and omissions, replacements, or changes can be made within the range not departing from the gist of the invention. The embodiments or the modifications thereof are included in the scope or the gist of the invention, and included in the range equivalent to the inventions set forth in claims.

For example, in the present embodiment, the ID provider device 200 side includes the trigger for requesting the use status acquisition process, but the trigger may be arranged at the service provider device 300 side. When the service provider device 300 side includes the trigger, in the service of step S10 in step S10 of FIG. 13, for example, the trigger determines whether or not the service use status registered to the SP service use status store 304 has been changed, and transmits the service use status acquisition execution request to the service use status providing unit 307 when it is determined that the service use status has been changed (step S11). Step S12 is not performed, and in step S13, the service use status providing unit 307 that has received the use status acquisition execution request acquires the service use status from the SP service use status store 304. Thereafter, the process of steps S14 to S19 is performed.

In this case, since there occurs no difference between the SP service use status store 304 and the IDP service use status store 202, the accurate policy evaluation based on the service use status can be performed.

Further, in the authentication collaboration system of the present embodiment, in the service use status acquisition of step S10 started by the trigger 213, since the decision of the deletion target account is performed in step S15, the deletion of the deletion target account is performed in the account collaboration of step S40. It is because this delays an operation such as deletion of an account as much as possible.

However, in order to give priority to improvement in a response time at the time of the SSO, the deletion of the deletion target account may be performed in the service use status acquisition of step S10. In other words, after the deletion target account decision of step S15, an account deletion message may be transmitted to the service provider device 300. In this case, in the account collaboration of step S40, only account registration is performed.

Further, for example, the update of the SP service use status store 304 of step S47 may be performed with reference to the user attribute partial information 302a stored in the SP user repository 302 at predetermined time intervals and may not be performed during the SSO process. As a result, the log-in standby time of the user can be reduced. At this time, the predetermined time interval for the update of the SP service use status store 304 is set to be smaller than a predetermined time interval set to the trigger for starting the service use status acquisition.

The technique described in the above embodiments may be stored in a storage medium such as a magnetic disk (such as a floppy (a registered trademark) disk) or a hard disk), an optical disk (such as a CD-ROM or a DVD), a magnetic optical (MO) disk, or a semiconductor memory and distributed as a program executable by a computer.

Here, any computer readable storage medium capable of storing a program may be used as the storage medium regardless of a storage format thereof.

Further, an operating system (OS), database management software, a middleware such as network software, or the like which operates on a computer based on an instruction of a program installed in a computer from a storage medium may be executed as a part of each process for implementing the present embodiment.

Further, in the present embodiment, the storage medium is not limited to a medium independent of a computer, and also includes a storage medium in which a program transmitted via a LAN or the Internet is downloaded and stored or temporarily stored.

Further, the number of storage media is not limited to one, and even when the process of the present embodiment is executed through a plurality of media, the media are included as the storage medium of the present embodiment, and a medium may have any configuration.

Further, in the present embodiment, a computer executes each process according to the present embodiment based on a program stored in the storage medium, and may have a configuration of a device configured with a personal computer or a configuration of a system in which a plurality of devices are connected via a network.

Further, each storage unit of the present embodiment may be implemented by a single storage device or a plurality of storage devices.

Furthermore, in the present embodiment, the computer is not limited to the personal computer, includes an arithmetic processing unit, a microcomputer, or the like included in an information processing device, and is a general term of equipment or a device capable of implementing the function of the present embodiment through a program.

DESCRIPTION OF THE REFERENCE NUMERALS

- 100: user terminal
- 200: ID provider device
- 201: IDP user repository
- 202: IDP service use status store
- 203: authentication collaboration policy store
- 204: SP user setting rule store
- 205: key storage unit
- 206: deletion target decision policy store
- 207: deletion target account store
- 208: IDP authentication collaborating unit
- 209: authentication collaboration handling unit
- 210: authentication collaboration policy evaluating unit
- 211: IDP account provisioning unit
- 212: service use status managing unit
- 213: trigger
- 214: service use status acquiring unit
- 215: deletion target account deciding unit
- 300: service provider device
- 301: service data communicating unit
- 302: SP user repository
- 303: service data store
- 304: SP service use status store
- 305: verification policy store
- 306: SP authentication collaborating unit
- 307: service use status providing unit
- 308: SP account provisioning unit

The invention claimed is:

1. An authentication collaboration system, comprising
an ID provider device that performs a log-in process on a user terminal operated by a user; and
a service provider device that transmits service data to the user terminal when the log-in process is completed,
wherein the user terminal transmits a service use request to the service provider device,
the ID provider device includes
an IDP user repository that stores user attribute information in which an item name of a user attribute specifying the user is associated with an item value of the user attribute, the user attribute information including a user ID identifying the user,
an IDP service use status store that stores service use status information in which the user ID, a service provider ID identifying the service provider device, and a use status of the service provider device are associated with one another,
an authentication collaboration policy store that stores authentication collaboration policy information representing a user which is a target to which transmission of service data by the service provider device identified by the service provider ID is permitted for each service provider ID,
an SP user setting rule store that stores the service provider ID in association with some item names among item names of a user attribute in the user attribute information,
a deletion target decision policy store that stores deletion target decision policy information representing a user which is a target in which transmission permission of service data is deleted in a service provider device identified by the service provider ID for each service provider ID,
a service use status acquiring unit that acquires service use status information transmitted from the service provider device when a predetermined cycle comes or when the use status of the service provider device is changed, and updates the IDP service use status store based on the acquired service use status information,
a deletion target account deciding unit that decides a deletion target account of each service provider ID included in the service use status information based on the user attribute information, the service use status information, and the deletion target decision policy information,
an authentication collaboration handling unit that transmits a user authentication request including address information of a user terminal in the authentication collaboration request when an authentication collaboration request including the service provider ID of the service provider device and the address information of the user terminal is received from the service provider device that has received the service use request,
an IDP authentication collaboration unit that transmits a log-in request to the user terminal based on the address information of the user terminal in the transmitted user authentication request, and executes a log-in process of authenticating the user ID and the user authentication information received from the user terminal based on a user ID and a password in the IDP user repository,
wherein the authentication collaboration handling unit transmits a policy evaluation request including the user ID used in the log-in process and the service provider ID in the authentication collaboration request when the log-in process is successfully performed, an authentication collaboration policy evaluating unit that reads the user attribute information from the IDP user repository based on the user ID in the transmitted policy evaluation request, reads the authentication collaboration policy information from the authentication collaboration policy store based on the service provider ID in the transmitted policy evaluation request, determines whether or not transmission of service data is to be permitted based on the read authentication collaboration policy information and the read user attribute information, and transmits a policy evaluation response including a determination result to a transmission source of the policy evaluation request, wherein the authentication collaboration handling unit transmits the account collaboration request including the user ID and the service provider ID in the policy evaluation request when the determination result in the policy evaluation response represents permission, an IDP account provisioning unit that reads some item names of a user attribute from the SP user setting rule store based on the service provider ID in the transmitted account collaboration request, acquires user attribute partial information including item names matching some item names and item values associated with the item names from the user attribute information including a user ID matching a user ID in the IDP user repository based on read some item names and the user ID in the account collaboration request, acquires a deletion target account from the deletion target account decided by the deletion target account deciding unit based on the service provider ID in the transmitted account collaboration request, generates an account collaboration request message by adding an account registration instruction to the acquired user attribute partial information as an operation instruction and adding an account deletion instruction or an account invalidating instruction to the acquired deletion target account as an operation instruction, transmits the account collaboration request message to a service provider device of a transmission source of the authentication collaboration request, and transmits an account collaboration response representing operation completion when operation completion including the service provider ID of the service provider device and the address information of the user terminal in the user attribute partial information is notified from a service provider device of a transmission destination of the account collaboration request message, wherein the authentication collaboration handling unit transmits an authentication collaboration execution request including the service provider ID included in the operation completion in the transmitted account collaboration response and the user ID, and wherein the IDP authentication collaboration unit transmits an authentication collaboration response including the user ID in the authentication collaboration execution request to the service provider device of the transmission source of the authentication collaboration request when the authentication collaboration execution request is received, and the service provider device includes an SP user repository that stores user attribute partial information in which some item names and item values are associated with each other among item names and item values of a user attribute in the user attribute information in the IDP user repository in association with an SP side user ID identifying the user in the service provider device, a service data store that stores the service data, an SP service use status store that stores the user ID in association with the use status of the service provider device, a service use status providing unit that acquires the use status of the service provider device from the SP service use status store, and transmitting the acquired use status to the ID provider device, an SP authentication collaboration unit that determines whether or not the service request includes an authentication token when the service request is received from the user terminal, transmits the authentication token and service data in the service data store to the user terminal when it is determined that the service request includes an authentication token, and transmits the authentication collaboration request to the ID provider device when it is determined that the service request does not include an authentication token, an SP account providing unit that issues a new SP side user ID and registers the issued SP side user ID and the user attribute partial information in the account collaboration request message to the SP user repository in association with each other when the account collaboration request message is received, and the operation instruction included in the account collaboration request message represents the account registration, searches the SP user repository based on the deletion target account in the account collaboration request message and deletes the user attribute partial information including the user ID matching the deletion target account when the operation instruction included in the account collaboration request message represents the account deletion, and notifies the ID provider device of the transmission source of the account collaboration request message of update completion including the registered user ID in the user attribute partial information or the deleted user ID in the user attribute partial information and the service provider ID of the service provider device after the registration or the deletion, wherein the SP authentication collaboration unit performs verification of the authentication collaboration response when the authentication collaboration response is received from the ID provider device, issuing the authentication token when a verification result represents permission, and transmits the service execution request including the user ID included in the authentication collaboration response and the authentication token, and transmits the authentication token in the service execution request and service data in the service data store to the user terminal based on the transmitted service execution request.

2. The authentication collaboration system according to claim 1, wherein the authentication collaboration policy evaluating unit determines whether or not transmission of service data is to be permitted based on the service use status information.

3. The authentication collaboration system according to claim 1 or claim 2, wherein the service account provisioning unit invalidates the user attribute partial information when the deletion target account matches the user ID included in the user attribute partial information.

4. The authentication collaboration system according to any one of claims 1 or 2, wherein
the service provider device transmits the use status to the ID provider device when the use status of the service provider device stored in the SP service use status store changes.

5. An ID provider device that is connected with a service provider device transmitting service data to a user terminal operated by a user to configure an authentication collaboration system, transmits a service use request to the service provider device, and performs a log-in process on the user terminal, the ID provider device comprising:
an IDP user repository that stores user attribute information in which an item name of a user attribute specifying the user is associated with an item value of the user attribute, the user attribute information including a user ID identifying the user;
an IDP service use status store that stores service use status information in which the user ID, a service provider ID identifying the service provider device, and a use status of the service provider device are associated with one another;
an authentication collaboration policy store that stores authentication collaboration policy information representing a user which is a target to which transmission of service data by the service provider device identified by the service provider ID is permitted for each service provider ID;
an SP user setting rule store that stores the service provider ID in association with some item names among item names of a user attribute in the user attribute information;
a deletion target decision policy store that stores deletion target decision policy information representing a user which is a target in which transmission permission of service data is to be deleted in a service provider device identified by the service provider ID for each service provider ID;
a service use status acquiring unit that transmits a use status acquisition request to the service provider device, acquires service use status information transmitted from the service provider device based on the use status acquisition request, and updates the IDP service use status store based on the acquired service use status information;
a deletion target account deciding unit that decides a deletion target account of each service provider ID included in the service use status information based on the user attribute information, the service use status information, and the deletion target decision policy information;
an authentication collaboration handling unit that transmits a user authentication request including address information of a user terminal in the authentication collaboration request when an authentication collaboration request including the service provider ID of the service provider device and the address information of the user terminal is received from the service provider device that has received the service use request;
IDP authentication collaboration unit that transmits a log-in request to the user terminal based on the address information of the user terminal in the transmitted user authentication request, and executes a log-in process of authenticating the user ID and the user authentication information received from the user terminal based on a user ID and a password in the IDP user repository;
wherein the authentication collaboration handling unit transmits a policy evaluation request including the user ID used in the log-in process and the service provider ID in the authentication collaboration request when the log-in process is successfully performed,
an authentication collaboration policy evaluating unit that reads the user attribute information from the IDP user repository based on the user ID in the transmitted policy evaluation request,
reads the authentication collaboration policy information from the authentication collaboration policy store based on the service provider ID in the transmitted policy evaluation request,
determines whether or not transmission of service data is to be permitted based on the read authentication collaboration policy information and the read user attribute information, and
transmits a policy evaluation response including a determination result to a transmission source of the policy evaluation request;
wherein the authentication collaboration handling unit transmits the account collaboration request including the user ID and the service provider ID in the policy evaluation request when the determination result in the policy evaluation response represents permission,
an IDP account provisioning unit that reads some item names of a user attribute from the SP user setting rule store based on the service provider ID in the transmitted account collaboration request,
acquires user attribute partial information including item names matching some item names and item values associated with the item names from the user attribute information including a user ID matching a user ID in the IDP user repository based on read some item names and the user ID in the account collaboration request,
acquires a deletion target account from the deletion target account decided by the deletion target account deciding unit based on the service provider ID in the transmitted account collaboration request,
generates an account collaboration request message by adding an account registration instruction to the acquired user attribute partial information as an operation instruction and adding an account deletion instruction or an account invalidating instruction to the acquired deletion target account as an operation instruction,
transmits the account collaboration request message to a service provider device of a transmission source of the authentication collaboration request, and
transmits an account collaboration response representing operation completion when operation completion including the service provider ID of the service provider device and the address information of the user terminal in the user attribute partial information is notified from a service provider device of a transmission destination of the account collaboration request message;
wherein the authentication collaboration handling unit transmits an authentication collaboration execution request including the service provider ID included in the operation completion in the transmitted account collaboration response and the user ID, and
wherein the IDP authentication collaboration unit transmits an authentication collaboration response including the user ID in the authentication collaboration execution request to the service provider device of the transmission source of the authentication collaboration request when the authentication collaboration execution request is received.

6. A non-transitory computer readable medium for causing a computer to perform operations of an ID provider device that is connected with a service provider device transmitting service data to a user terminal operated by a user to configure an authentication collaboration system, transmits a service use request to the service provider device, and performs a log-in process on the user terminal, the operations comprising:

a function of storing user attribute information in which an item name of a user attribute specifying the user is associated with an item value of the user attribute, the user attribute information including a user ID identifying the user;

a function of storing authentication collaboration policy information representing a user which is a target to which transmission of service data by the service provider device identified by the service provider ID is permitted for each service provider ID;

a function of storing the service provider ID in association with some item names among item names of a user attribute in the user attribute information;

a function of storing deletion target decision policy information representing a user which is a target in which transmission permission of service data is to be deleted in a service provider device identified by the service provider ID for each service provider ID;

a function of transmitting a use status acquisition request to the service provider device, acquiring service use status information transmitted from the service provider device based on the use status acquisition request, and storing service use status information in which the user ID, a service provider ID identifying the service provider device, and a use status of the service provider device are associated with one another based on the acquired service use status information;

a function of deciding a deletion target account of each service provider ID included in the service use status information based on the user attribute information, the service use status information, and the deletion target decision policy information;

a function of transmitting a user authentication request including address information of a user terminal in the authentication collaboration request when an authentication collaboration request including the service provider ID of the service provider device and the address information of the user terminal is received from the service provider device that has received the service use request;

a function of transmitting a log-in request to the user terminal based on the address information of the user terminal in the transmitted user authentication request, and executing a log-in process of authenticating the user ID and the user authentication information received from the user terminal based on a user ID and a password of the user attribute information;

a function of transmitting a policy evaluation request including the user ID used in the log-in process and the service provider ID in the authentication collaboration request when the log-in process is successfully performed;

a function of reading the user attribute information based on the user ID in the transmitted policy evaluation request;

a function of reading the authentication collaboration policy information based on the service provider ID in the transmitted policy evaluation request;

a function of determining whether or not transmission of service data is to be permitted based on the read authentication collaboration policy information and the read user attribute information;

a function of transmitting a policy evaluation response including a determination result to a transmission source of the policy evaluation request;

a function of transmitting the account collaboration request including the user ID and the service provider ID in the policy evaluation request when the determination result in the policy evaluation response represents permission;

a function of reading some item names of a user attribute based on the service provider ID in the transmitted account collaboration request;

a function of acquiring user attribute partial information including item names matching some item names and item values associated with the item names from the user attribute information including a user ID matching a user ID based on read some item names and the user ID in the account collaboration request;

a function of acquiring a deletion target account from the decided deletion target account based on the service provider ID in the transmitted account collaboration request;

a function of generating an account collaboration request message by adding an account registration instruction to the acquired user attribute partial information as an operation instruction and adding an account deletion instruction or an account invalidating instruction to the acquired deletion target account as an operation instruction;

a function of transmitting the account collaboration request message to a service provider device of a transmission source of the authentication collaboration request;

a function of transmitting an account collaboration response representing operation completion when operation completion including the service provider ID of the service provider device and the address information of the user terminal in the user attribute partial information is notified from a service provider device of a transmission destination of the account collaboration request message;

a function of transmitting an authentication collaboration execution request including the service provider ID included in the operation completion in the transmitted account collaboration response and the user ID, and a function of transmitting an authentication collaboration response including the user ID in the authentication collaboration execution request to the service provider device of the transmission source of the authentication collaboration request when the authentication collaboration execution request is received.

* * * * *